US012784682B2

(12) United States Patent
Pyo et al.

(10) Patent No.: US 12,784,682 B2
(45) Date of Patent: Nov. 3, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Donghak Pyo, Yongin-si (KR); Yangsoo Kim, Yongin-si (KR); Jinwoo Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/211,577

(22) Filed: May 19, 2025

(65) Prior Publication Data

US 2026/0073865 A1 Mar. 12, 2026

(30) Foreign Application Priority Data

Sep. 9, 2024 (KR) ........................ 10-2024-0122449

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0291* (2013.01); *G09G 2310/08* (2013.01); *G09G 2320/043* (2013.01); *G09G 2330/021* (2013.01)

(58) Field of Classification Search
CPC ......... G09G 3/3233; G09G 2300/0819; G09G 2300/0842; G09G 2300/0861; G09G 2310/0291; G09G 2310/08; G09G 2320/043; G09G 2330/021
See application file for complete search history.

(56) References Cited

U.S. PATENT DOCUMENTS

2010/0245332 A1 9/2010 Hsu
2023/0010045 A1 1/2023 Tsuchi
2024/0005860 A1 1/2024 Kim et al.
2024/0078976 A1 3/2024 Cheng et al.
2025/0166565 A1 5/2025 Song et al.

FOREIGN PATENT DOCUMENTS

JP 2021021936 A * 2/2021
KR 10-2025-0072691 A 5/2025

OTHER PUBLICATIONS

Extended European Search Report dated Jan. 30, 2026 in related European Patent Application No. 25198016.5 (12 pages).

* cited by examiner

*Primary Examiner* — Stacy Khoo
(74) *Attorney, Agent, or Firm* — F. CHAU & ASSOCIATES, LLC

(57) ABSTRACT

A display device includes a display panel including pixels, a gate driver configured to output a gate signal to the pixels, a data driver configured to apply a data voltage to the display panel and a driving controller configured to control the gate driver and the data driver. A period in which the display panel is driven may include first to third periods. In the first period, the first gate signal has an activation level, the second gate signal has an inactivation level, the first data voltage may have a first voltage level, and the second data voltage may have a third voltage level. In the second period, the first gate signal may have an inactivation level, the second gate signal may have an activation level, the first data voltage may be changed to a second voltage level, and the second data voltage may have the third voltage level.

20 Claims, 14 Drawing Sheets

DISPLAY DEVICE AND ELECTRONIC DEVICE INCLUDING THE SAME

CROSS-REFERENCE TO RELATED APPLICATION

This application claims priority under 35 USC § 119 to Korean Patent Application No. 10-2024-0122449, filed on Sep. 9, 2024 in the Korean Intellectual Property Office (KIPO), the entire disclosure of which is herein incorporated by reference in its entirety.

TECHNICAL FIELD

Embodiments of the present inventive concept relate to a display device and an electronic device including the same. More particularly, the display device improves a display quality of a display panel by reducing fluctuation of a power voltage applied to the display panel.

DISCUSSION OF THE RELATED ART

A display device may include a display panel and a display panel driver. The display panel may include a plurality of gate lines, a plurality of data lines, a plurality of emission lines and a plurality of pixels. The display panel driver may include a gate driver providing gate signals to the gate lines, a data driver providing a data voltage to the data lines, an emission driver providing emission signals to the emission lines, and a driving controller providing control signals to the gate driver, the data driver and the emission driver.

While providing the data voltage to the data lines, power voltage applied to the display panel may fluctuate due to coupling with voltage changes of the data lines. The power voltage fluctuation in the display panel may deteriorate display quality of the display panel.

SUMMARY

Embodiments of the present inventive concept provide a display device and improving a display quality and an electronic device including the display device for improving a display quality of a display panel.

According to embodiments, a display device may include a display panel including a plurality of pixels, a gate driver configured to output a gate signal to the pixels, a data driver configured to apply a data voltage to the display panel and a driving controller configured to control the gate driver and the data driver. The display panel may emit based on the data voltage. The display panel may include first to fourth pixel-rows. The data voltage may include a first data voltage and a second data voltage. The first data voltage may be applied to the first pixel-row and the third pixel-row. The second data voltage may be applied to the second pixel-row and the fourth pixel-row. The gate signal may include a first gate signal and a second gate signal. The first gate signal may be outputted to the first pixel-row and the second pixel-row. The second gate signal may be outputted to the third pixel-row and the fourth pixel-row. When the gate signal has an activation level, the data voltage may be applied to the pixel-row. A period in which the display panel is driven may include first to third periods. In the first period, the first gate signal has an activation level, the second gate signal has an inactivation level, the first data voltage may have a first voltage level, and the second data voltage may have a third voltage level. In the second period, the first gate signal may have an inactivation level, the second gate signal may have an activation level, the first data voltage may be changed to a second voltage level, and the second data voltage may have the third voltage level.

In an embodiment, in the third period, the first gate signal may have an inactivation level, the second gate signal may have an activation level, the first data voltage may have the second voltage level, and the second data voltage may be changed to a fourth voltage level.

In an embodiment, when the first data voltage is changed from the first voltage level and the second voltage level, the first data voltage may be changed with a first slew rate. When the second data voltage is changed from the third voltage level to the fourth voltage level, the second data voltage may be changed with a second slew rate different from the first slew rate.

In an embodiment, the first slew rate may be greater than the second slew rate.

In an embodiment, the period in which the display panel is driven may further include a fourth period. In the fourth period, the first data voltage may be changed from the second voltage level to a fifth voltage level different from the second voltage level. In the fourth period, the second data voltage may be changed from the second voltage level to the sixth voltage level different from the fourth voltage level. When the first data voltage is changed from the second voltage level to the fifth voltage level, the first data voltage may be changed with the second slew rate. When the second data voltage is changed from the fourth voltage level to the sixth voltage level, the second data voltage may be changed with the first slew rate.

In an embodiment, the data driver may include a data voltage generating block configured to generate the data voltage based on a data signal and a buffer block configured to output the first data voltage and the second data voltage based on the data voltage and a delay signal. The buffer block may control an output delay of at least one of the first data voltage and the second data voltage.

In an embodiment, the buffer block may output the second data voltage with the output delay.

In an embodiment, the buffer block may include a plurality of first amplifiers and a plurality of second amplifiers. The first amplifiers may output the first data voltage based on a first bias voltage. The second amplifiers may output the second data voltage based on a second bias voltage. When the output delay of the second data voltage is controlled, the second bias voltage may be lower than the first bias voltage.

In an embodiment, the display panel may further include first to fourth data lines. At least one first amplifier of the first amplifiers may be connected to the first data line and the third data line, and at least one second amplifier of the second amplifiers may be connected to the second data line and the fourth data line.

In an embodiment, the display panel may include a first data line receiving the first data voltage and a second data line receiving the second data voltage. The first pixel-row may include a first pixel, the second pixel-row includes a second pixel, the third pixel-row includes a third pixel, and the fourth pixel-row includes a fourth pixel. The first pixel and the third pixel may be connected to the first data line. The second pixel and the fourth pixel may be connected to the second data line.

In an embodiment, at least one of the pixels may include a first transistor configured to generate a driving current based on a voltage of a first node, a second transistor configured to apply the data voltage to the first node in response to the gate signal and a light emitting element configured to emit based on the driving current.

According to embodiments, a display device may include a display panel including a plurality of pixels, a gate driver configured to output a gate signal to the pixels, a data driver configured to apply a data voltage to the display panel and a driving controller configured to control the gate driver and the data driver. The display panel may emit based on the data voltage. The display panel may include first to fourth pixel-rows. The data voltage may include a first data voltage and a second data voltage. The first data voltage may be applied to the first pixel-row and the third pixel-row. The second data voltage may be applied to the second pixel-row and the fourth pixel-row. The data driver may include a data voltage generating block configured to generate the data voltage based on a data signal and a buffer block configured to output the first data voltage and the second data voltage based on the data voltage and a delay signal. The buffer block may control an output delay of at least one of the first data voltage and the second data voltage.

In an embodiment, the gate signal may include a first gate signal and a second gate signal. The first gate signal may be outputted to the first pixel-row and the second pixel-row. The second gate signal may be outputted to the third pixel-row and the fourth pixel-row. After the first gate signal is outputted, the second gate signal may be outputted.

In an embodiment, the buffer block may include a plurality of first amplifiers and a plurality of second amplifiers. The first amplifiers may output the first data voltage based on a first bias voltage. The second amplifiers may output the second data voltage based on a second bias voltage. When the output delay of the second data voltage is controlled, the second bias voltage may be lower than the first bias voltage.

According to embodiments, an electronic device may include a processor configured to output input image data and an input control signal, a display panel including a plurality of pixels, a gate driver configured to output a gate signal to the pixels, a data driver configured to apply a data voltage to the display panel and a driving controller configured to control the gate driver and the data driver based on the input image data and the input control signal. The display panel may emit based on the data voltage. The display panel may include first to fourth pixel-rows. The data voltage may include a first data voltage and a second data voltage. The first data voltage may be applied to the first pixel-row and the third pixel-row. The second data voltage may be applied to the second pixel-row and the fourth pixel-row. The gate signal may include a first gate signal and a second gate signal. The first gate signal may be outputted to the first pixel-row and the second pixel-row. The second gate signal may be outputted to the third pixel-row and the fourth pixel-row. When the gate signal has an activation level, the data voltage may be applied to the pixel-row. A period in which the display panel is driven may include first to third periods. In the first period, the first gate signal may have an activation level, the second gate signal may have an inactivation level, the first data voltage may have a first voltage level, and the second data voltage may have a third voltage level. In the second period, the first gate signal may have an inactivation level, the second gate signal may have an activation level, the first data voltage may be changed to a second voltage level, and the second data voltage may have the third voltage level.

In an embodiment, in the third period, the first gate signal may have an inactivation level, the second gate signal may have an activation level, the first data voltage may have the second voltage level, and the second data voltage may be changed to a fourth voltage level.

In an embodiment, when the first data voltage is changed from the first voltage level and the second voltage level, the first data voltage may be changed with a first slew rate. When the second data voltage is changed from the third voltage level to the fourth voltage level, the second data voltage may be changed with a second slew rate different from the first slew rate.

In an embodiment, the first slew rate may be greater than the second slew rate.

In an embodiment, the period in which the display panel is driven may further include a fourth period. In the fourth period, the first data voltage may be changed from the second voltage level to a fifth voltage level different from the second voltage level. In the fourth period, the second data voltage may be changed from the second voltage level to the sixth voltage level different from the fourth voltage level. When the first data voltage is changed from the second voltage level to the fifth voltage level, the first data voltage may be changed with the second slew rate. When the second data voltage is changed from the fourth voltage level to the sixth voltage level, the second data voltage may be changed with the first slew rate.

In an embodiment, the data driver may include a data voltage generating block configured to generate the data voltage based on a data signal and a buffer block configured to output the first data voltage and the second data voltage based on the data voltage and a delay signal. The buffer block may control an output delay of at least one of the first data voltage and the second data voltage.

An even-numbered data voltage may be changed after an odd-numbered data voltage is changed. Because a timing in which the odd-numbered data voltage is changed may be different from a timing in which the even-numbered data voltage, power voltage fluctuation, due to a change of data voltage, may be reduced in a frame period, and a driving reliability of a light emitting element may be improved. Accordingly, a display quality of a display panel may be improved.

BRIEF DESCRIPTION OF THE DRAWINGS

Embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

A display device may include a display panel including a plurality of pixels, a gate driver configured to provide a write gate signal to a pair of an odd-numbered pixel-row and an even-numbered pixel-row among the plurality of pixels, a data driver configured to provide a data voltage to the selected pair of odd-numbered pixel-row and the even-numbered pixel-row The data voltage includes a first data voltage and a second data voltage, and the first data voltage is applied to the selected odd-numbered pixel-row at a first timing, and the second data voltage is applied to the selected even-numbered pixel-row at a second timing, and the first timing is earlier than the second timing by a first delay.

Figure 1:
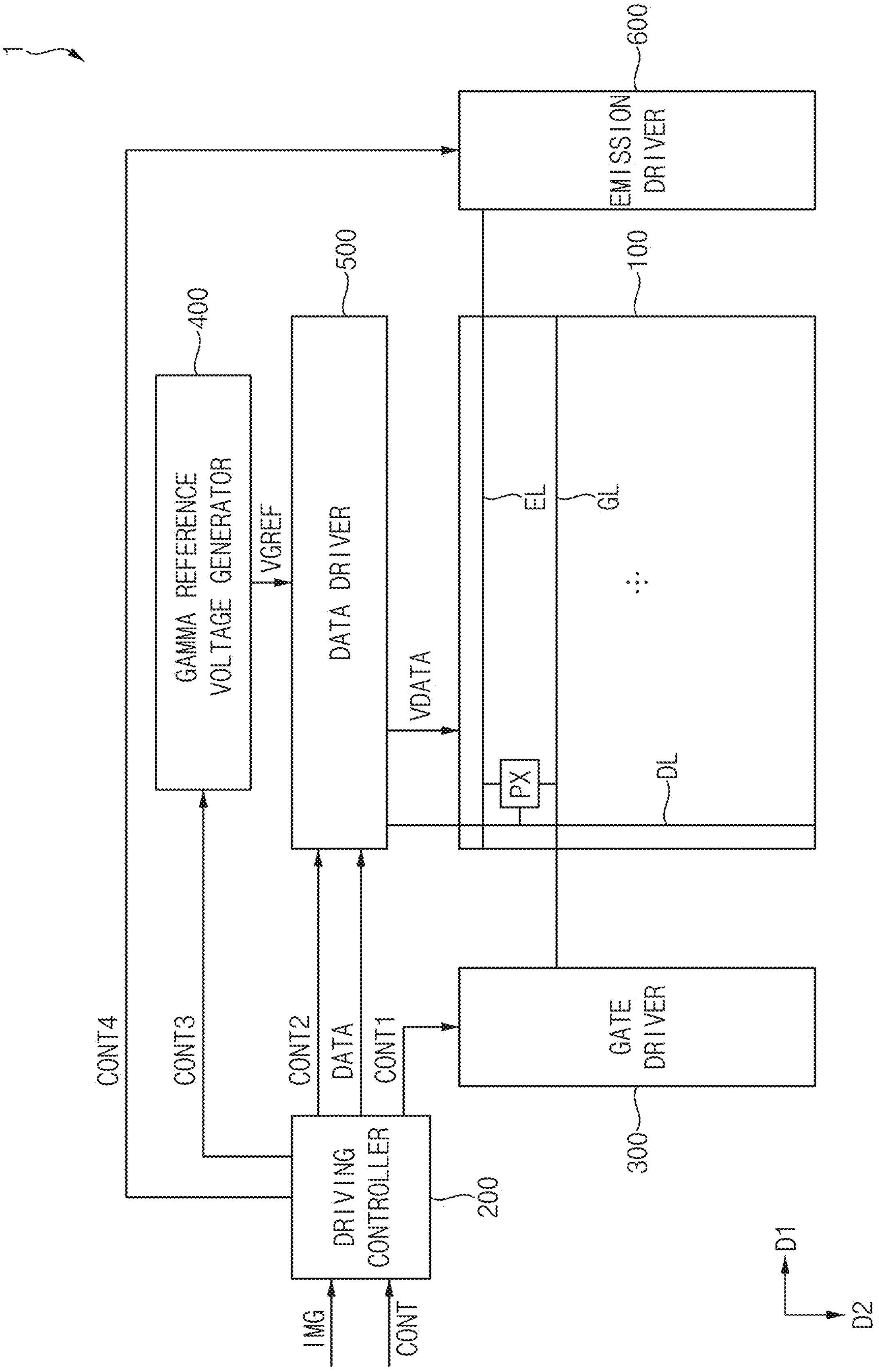
FIG. 1 is a block diagram illustrating a display device according to embodiments of the present inventive concept.

FIG. 1 is a block diagram illustrating a display device according to embodiments of the present inventive concept.

Referring to FIG. 1, the display device 1 may include a display panel 100, a driving controller 200, a gate driver 300, a gamma reference voltage generator 400, a data driver 500 and an emission driver 600.

The display panel 100 may have a display region on which an image is displayed and a peripheral region adjacent to the display region.

The display panel 100 may include a plurality of gate lines GL, a plurality of data lines DL, a plurality of emission lines EL and a plurality of pixels PX electrically connected to the gate lines GL, the data lines DL and the emission lines EL. The gate lines GL may extend in a first direction D1. The data lines DL may extend in a second direction D2 perpendicular to the first direction D1. The emission lines EL may extend in the first direction D1.

The driving controller 200 may receive input image data IMG and an input control signal CONT from an external device. For example, the input image data IMG may include red image data, green image data, blue image data, and white image data. The input image data IMG may further include magenta image data, cyan image data and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may control an operation of the gate driver 300 by generating the first control signal CONT1 based on the input control signal CONT and providing the first control signal CONT1 to the gate driver 300. The first control signal CONT1 may include a vertical start signal and a gate clock signal.

The driving controller 200 may control an operation of the data driver 500 by generating the second control signal CONT2 based on the input control signal CONT and providing the second control signal CONT2 to the data driver 500. The second control signal CONT2 may include a horizontal start signal and a load signal. The second control signal CONT2 may further include a delay signal DS which is described in detail referring to FIG. 11.

The driving controller 200 may generate the data signal DATA based on the input image data IMG, and provide the data signal DATA to the data driver 500.

The driving controller 200 may control an operation of the gamma reference voltage generator 400 by generating the third control signal CONT3 based on the input control signal CONT and providing the third control signal CONT3 to the gamma reference voltage generator 400.

The driving controller 200 may control an operation of the emission driver 600 by generating the fourth control signal CONT4 based on the input control signal CONT and providing the fourth control signal CONT4 to the emission driver 600.

The gate driver 300 may receive the first control signal CONT1 from the driving controller 200, and a gate high voltage and a gate low voltage from a voltage generator included in the gate driver 300. The gate driver 300 may generate gate signals driving the gate lines GL based on the first control signal CONT1, the gate high voltage and the gate low voltage, and provide the gate signals to the gate lines GL. The gate signals may include an initialization gate signal, a write gate signal, a compensation gate signal and a bias gate signal.

The gate driver 300 may be disposed in a circuit block of the peripheral region. Alternatively, the gate driver 300 may be disposed in a distributed manner in the peripheral region.

The gamma reference voltage generator 400 generates a gamma reference voltage VGREF in response to the third control signal CONT3 received from the driving controller 200 and provides the gamma reference voltage VGREF to the data driver 500. A voltage value of the gamma reference voltage VGREF may correspond to a voltage level of the data signal DATA.

The gamma reference voltage generator 400 may be integrated into the driving controller 200, or into the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF, and provides the data voltages VDATA to the data lines DL. The pixel PX may emit light as a luminance corresponding to the data voltage VDATA.

The data driver 500 may be disposed in a circuit block of the peripheral region of the display panel 100. Alternatively, the data driver 500 may be disposed in a distributed manner in the peripheral region.

The emission driver 600 may generate emission signals EM in response to the fourth control signal CONT4 received from the driving controller 200, and provide the emission signals to the display panel 100.

The emission driver 600 may be disposed in a circuit block of the peripheral region. Alternatively, the emission driver 600 may be disposed in a distributed manner in the peripheral region.

Although an embodiment shown in FIG. 1 illustrates that the gate driver 300 is disposed on a first side of the display panel 100, and the emission driver 600 is disposed on a second side of the display panel 100, the present inventive concept is not limited thereto. For example, the gate driver 300 and the emission driver 600 may be disposed on the first side of the display panel 100. More particularly, the gate driver 300 and the emission driver 600 may be disposed on the peripheral region of the first side of the display panel 100. The gate driver 300 and the emission driver 600 may be formed in an integrated manner.

Figure 2:
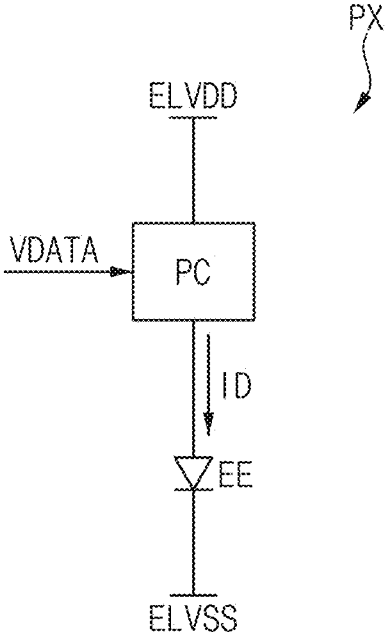
FIG. 2 is a diagram illustrating a pixel included in a display panel.

FIG. 2 is a diagram illustrating a pixel PX included in a display device.

Referring to FIG. 1 and FIG. 2, the pixel PX may include a pixel circuit PC and a light emitting element EE.

The pixel circuit PC may generate a driving current ID based on the data voltage VDATA and a first power voltage ELVDD. The pixel circuit PX may apply the driving current ID to the light emitting element EE, in which the light emitting element EE emits light corresponding to the driving current ID.

The light emitting element EE may include a first electrode receiving the driving current ID and a second electrode connected to a second power voltage ELVSS. The light emitting element EE may emit light based on the driving current ID. The light emitting element EE may be an organic light emitting diode (OLED), but not limited thereto. For example, the light emitting element EE may be a nano light emitting diode (NED), a quantum dot (QD) light emitting diode, a micro light emitting diode, an inorganic light emitting diode, or any other suitable light emitting element. The first power voltage ELVDD connected to the pixel PX may provide the driving current ID to the light emitting element EE. Because the first power voltage ELVDD may be fluctuated while the driving current ID is drawn out from the first power voltage ELVDD, the driving current ID also may vary in response to the fluctuation of the first power voltage ELVDD. Furthermore, the fluctuation of the first power voltage ELVDD may become worse when multiple pixels operate simultaneously by receiving the data voltages VDATA at a time point. Therefore, the fluctuation of the power voltage ELVDD and the driving current ID may deteriorate display quality of the display panel 100. According to embodiments of the present inventive concept, by distributing operation timings of the pixels, the fluctuation of the first power line voltage ELVDD may be reduced, thereby the display quality of the display panel 100 may be improved.

Figure 3:
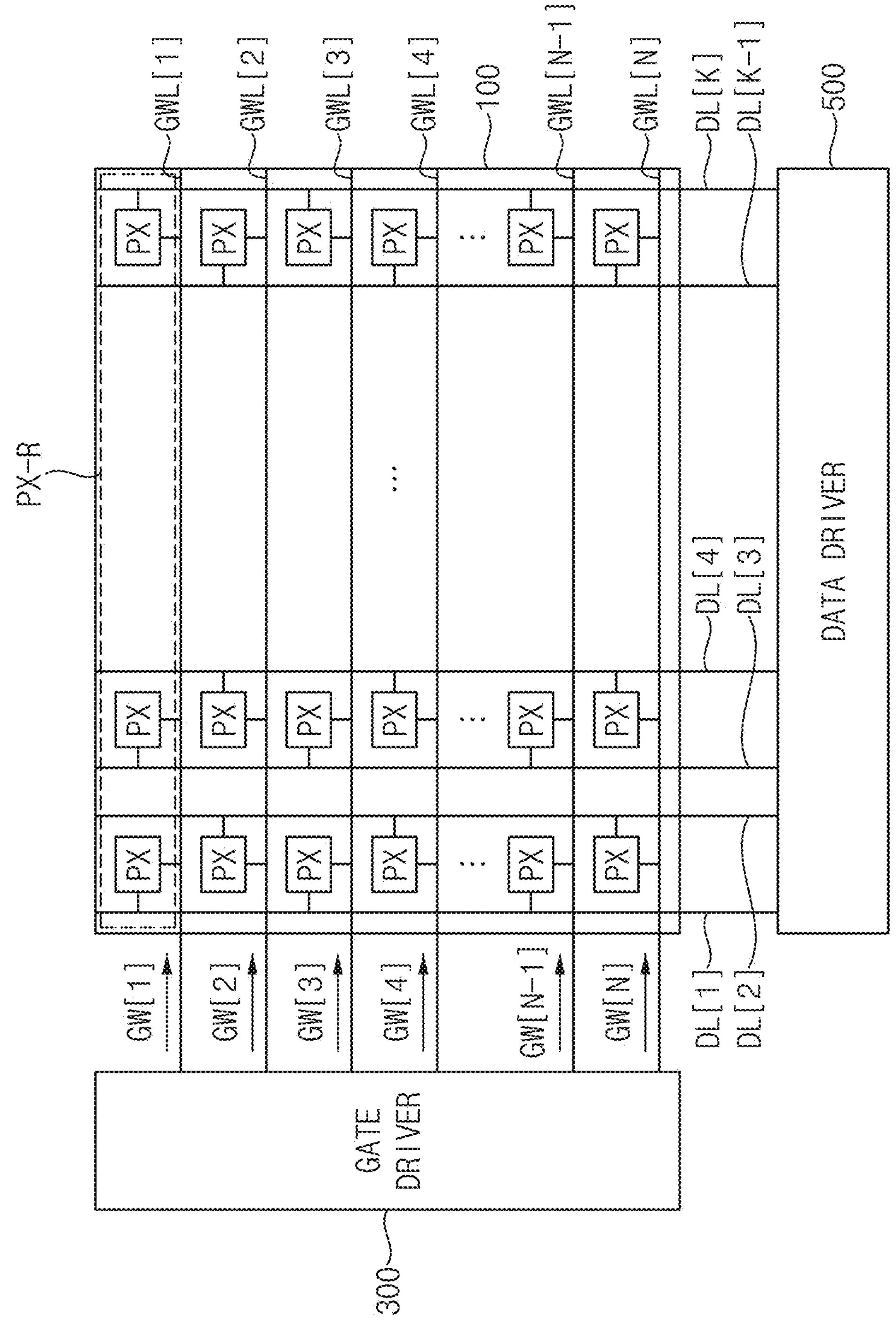
FIG. 3 is a block diagram illustrating a display panel, a gate driver and a data driver included in a display device.
Figure 4:
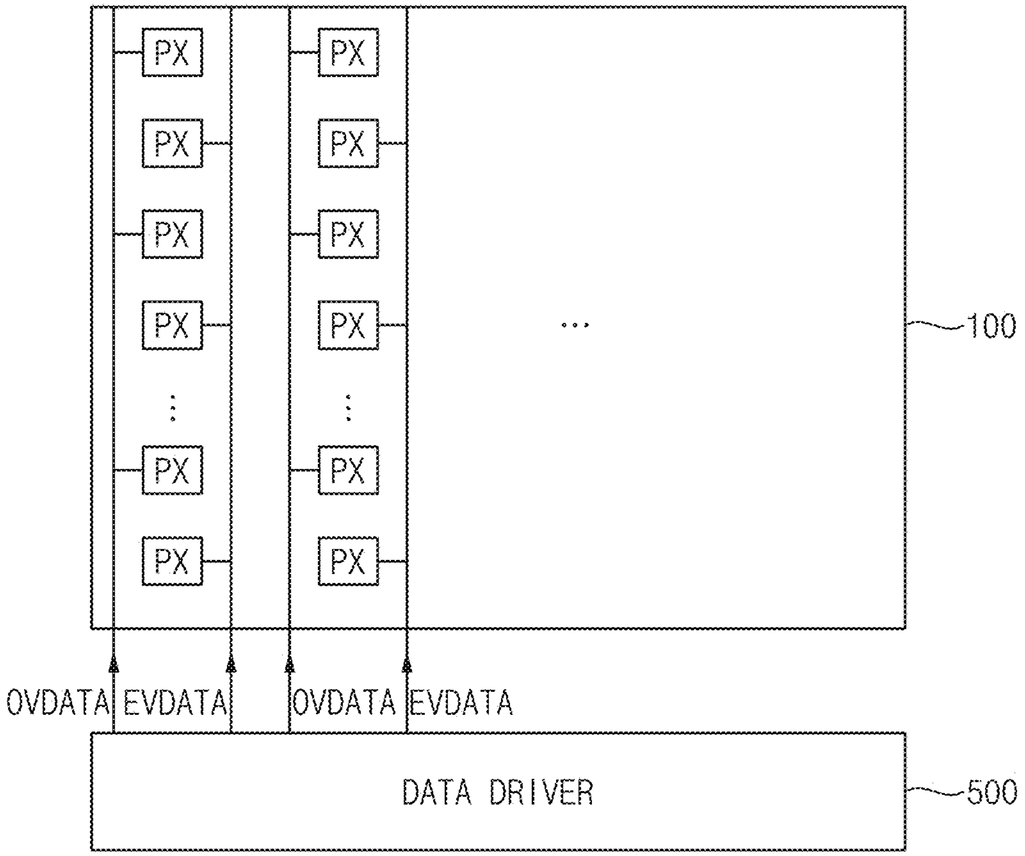
FIG. 4 is a block diagram illustrating a display panel and a data driver included in a display device.

FIG. 3 is a block diagram illustrating a display panel, a gate driver and a data driver included in a display device. FIG. 4 is a block diagram illustrating a display panel and a data driver included in a display device.

Referring to FIG. 1 to FIG. 4, the display panel 100 may include first to Nth write gate lines GWL[1], GWL[2], GWL[3], GWL[4] to GWL[N−1] and GWL[N] and first to Kth data lines DL[1], DL[2], DL[3], DL[4] to DL[K−1] and DL[K]. Herein, N and K are even natural numbers. The display panel 100 may include a plurality of pixel-rows PX-R. Each pixel-row PX-R may include pixels PX connected to a write gate line and each of the pixels PX may be connected to corresponding data line respectively. The display panel 100 may include first to Nth pixel-rows PX-R.

According to an embodiment, each of the first to Nth write gate lines provides a write gate signal to write gate transistors of pixels PX connected to the write gate lines. Each of the pixels PX connected to the write gate line may be connected to corresponding data line among the first to Kth data lines DL[1] to DL[K]. For example, the first pixel-row may be connected to the first write gate line GWL[1] and receive data voltages through odd-numbered data lines among the first to Kth data lines DL[1] to DL[K]. The first write gate signal GW[1] may be applied to the first write gate line GWL[1]. The second pixel-row may be connected to the second write gate line GWL[2] and receive data voltages through even-numbered data lines among the first to Kth data lines DL[1] to DL[K]. The second write gate signal GW[2] may be applied to the second write gate line GWL[2]. The third pixel-row may be connected to the third write gate line GWL[3] and receive data voltages through odd-numbered data lines among the first to Kth data lines DL[1] to DL[K]. The third write gate signal GW[3] may be applied to the third write gate line GWL[3]. The fourth pixel-row may be connected to the fourth write gate line GWL[4] and receive data voltages through even-numbered data lines among the first to Kth data lines DL[1] to DL[K]. The fourth write gate signal GW[4] may be applied to the fourth write gate line GWL[4]. The N−1th pixel-row may be connected to the N−1th write gate line GWL[N−1] and receive data voltages through odd-numbered data lines among the first to Kth data lines DL[1] to DL[K]. The N−1th write gate signal GW[N−1] may be applied to the N−1th write gate line GWL[N−1]. The Nth pixel-row may be connected to the Nth write gate line GWL[N] and receive data voltages through even-numbered data lines among the first to Kth data lines DL[1] to DL[K]. The Nth write gate signal GW[N] may be applied to the Nth write gate line GWL[N].

Referring to FIG. 4, odd-numbered pixel-rows may be connected to the odd-numbered data lines. For example, the first pixel-row and the third pixel-row may be connected to the odd-numbered data lines among the first to Kth data lines DL[1] to DL[K] respectively. Likewise, even-numbered pixel-rows may be connected to the even-numbered data lines. For example, the second pixel-row and the fourth pixel-row may be connected to the even-numbered data lines among the first to Kth data lines DL[1] to DL[K] respectively.

The data driver 500 may further include a plurality of demultiplexers for selectively providing the data voltage VDATA to one of the odd-numbered data lines or even-numbered data lines. For example, a first demultiplexer among the plurality of demultiplexers may select one of the first data line DL[1] and the second data line DL[2], and provide the data voltage VDATA to the selected data line among the first data line DL[1] and the second data line DL[2]. Referring to FIG. 4, the display panel 100 may include a plurality of pixel-columns PX-C. The number of the pixel-columns may correspond to half of the data lines number. Each of the pixel columns may include pixels connected to one of the odd-numbered data lines or even-numbered data lines. For example, the pixels PX in a first pixel-column may be connected to one of the first data line DL[1] and the second data line DL[2]. The first data line DL[1] may be connected to a first pixel of the first pixel-column, and the second data line DL[2] may be connected to a second pixel of the first pixel-column.

The first data line DL[1] may be connected to odd-numbered pixels of the first pixel column PX which are also connected to odd-numbered write gate lines among the first to Nth write gate lines GWL[1] to GWL[N]. The second data line DL[2] may be connected to even-numbered pixels of the first pixel column PX which are also connected to even-numbered write gate lines among the first to Nth write gate lines GWL[1] to GWL[N]. The first and third pixels of the pixel columns PX-C may be connected to odd-numbered pixel-rows among the plurality of pixel-rows PX-R, and the second and fourth pixels of the pixel columns PX-C may be connected to even-numbered pixel-rows among the plurality of pixel-rows PX-R.

Additionally, the data driver 500 may apply an odd-numbered data voltage OVDATA to the odd-numbered data lines. The odd-numbered data voltage OVDATA may be referred to as a first data voltage. The data driver 500 may apply an even-numbered data voltage EVDATA to the even-numbered data lines. The even-numbered data voltage EVDATA may be referred to as a second data voltage. The odd-numbered pixel-row may receive the odd-numbered data voltage OVDATA, and the even-numbered pixel-row may receive the even-numbered data voltage EVDATA. In a case, where the first to Kth data lines DL[1] to DL[K] are disposed in a sequential manner in the display panel 100, the odd-numbered data lines including the first data line DL[1] and the third data line DL[3] among the first to Kth data lines DL[1] to DL[K] may be disposed alternately with the even-numbered data lines. The even-numbered data lines including the second data line DL[2] and the fourth data line DL[4] among the first to Kth data lines DL[1] to DL[K] may be disposed alternately with the odd-numbered data lines. The data voltages of the first to Kth data lines DL[1] to DL[K] is transferred to the pixels PX by turning on the write gate transistor of the pixel PX. The write gate transistor of the pixel PX may be turned on when an activation level of the write gate signal is applied to the write gate transistor. The activation level may be a level of voltage that turns on the write gate transistor, and an inactivation level may be a level of voltage that turns off the write gate transistor.

Upon receiving the write gate signal which has an activation level, a pixel circuit PC may enter into an activation period and the data voltage VDATA may be transferred to the pixel circuit PC. When the write gate signal has an inactivation level, the pixel circuit PC may stay in an inactivation period and the data voltage VDATA is not transferred to the pixel circuit PC.

According to an embodiment, an activation period of the first write gate signal GW[1] and an activation period of the second write gate signal GW[2] may be substantially same. Therefore, the first write gate signal GW[1] and the second write gate signal GW[2] may be transmitted to the pixel circuit PC simultaneously. Accordingly, a timing in which the first pixel-row receives the odd-numbered data voltage OVDATA, and a timing in which the second pixel-row receives the even-numbered data voltage EVDATA may be close each other. Hereinafter, a pair of the first write gate signal GW[1] and the second write gate signal GW[2] may be referred to as a first gate signal.

Likewise, an activation period of the third write gate signal GW[3] and an activation period of the fourth write gate signal GW[4] may be substantially same. Therefore, the third write gate signal GW[3] and the fourth write gate signal GW[4] may be transmitted to the pixel circuit PC simultaneously. Accordingly, a timing in which the third pixel-row receives the odd-numbered data voltage OVDATA and a timing in which the fourth pixel-row receives the even-numbered data voltage EVDATA may be close to each other. Hereinafter, a pair of the third write gate signal GW[3] and the fourth write gate signal GW[4] may be referred to as a second gate signal.

An activation period of the N−1th write gate signal GW[N−1] and an activation period of the Nth write gate signal GW[N] may be substantially same. Therefore, the N−1th write gate signal GW[N−1] and the Nth write gate signal GW[N] may be transmitted to the pixel circuit PC simultaneously. Accordingly, a timing in which the N−1th pixel-row receives the odd-numbered data voltage OVDATA and a timing in which the Nth pixel-row receives the even-numbered data voltage EVDATA may be close each other.

The data voltage VDATA may be differently applied to different pixel-rows PX-R according to a selection of pixel-rows to be activated by an activation level of the write gate signal corresponding to the selected pixel-row. For example, the odd-numbered data voltage OVDATA, while the first write gate signal GW[1] is in an activation level, may be different from the odd-numbered data voltage OVDATA while the third write gate signal GW[3] is in an activation level. For example, the odd-numbered data voltage OVDATA may be a first voltage level when the first write gate signal GW[1] is in an activation level, and may be changed from the first voltage level to a second voltage level when the first write gate signal GW[1] transitions from an activation level to an inactivation level, and the odd-numbered data voltage OVDATA may be second voltage level when the third write gate signal GW[3] is in the activation level, and may be changed from the second voltage level to a fifth voltage level. The even-numbered data voltage EVDATA while the second write gate signal GW[2] is in the activation level may be different with the even-numbered data voltage EVDATA while the fourth write gate signal GW[4] is in the activation level. For example, the even-numbered data voltage EVDATA may be a third voltage level when the second write gate signal GW[2] is in the activation level, and may be changed from the third voltage level to a fourth voltage level when the first write gate signal GW[2] transitions from an activation level to an inactivation level, and the even-numbered data voltage EVDATA may be fourth voltage level when the fourth write gate signal GW[4] is in the activation level, and may be changed from the fourth voltage level to a sixth voltage level.

Figure 5:
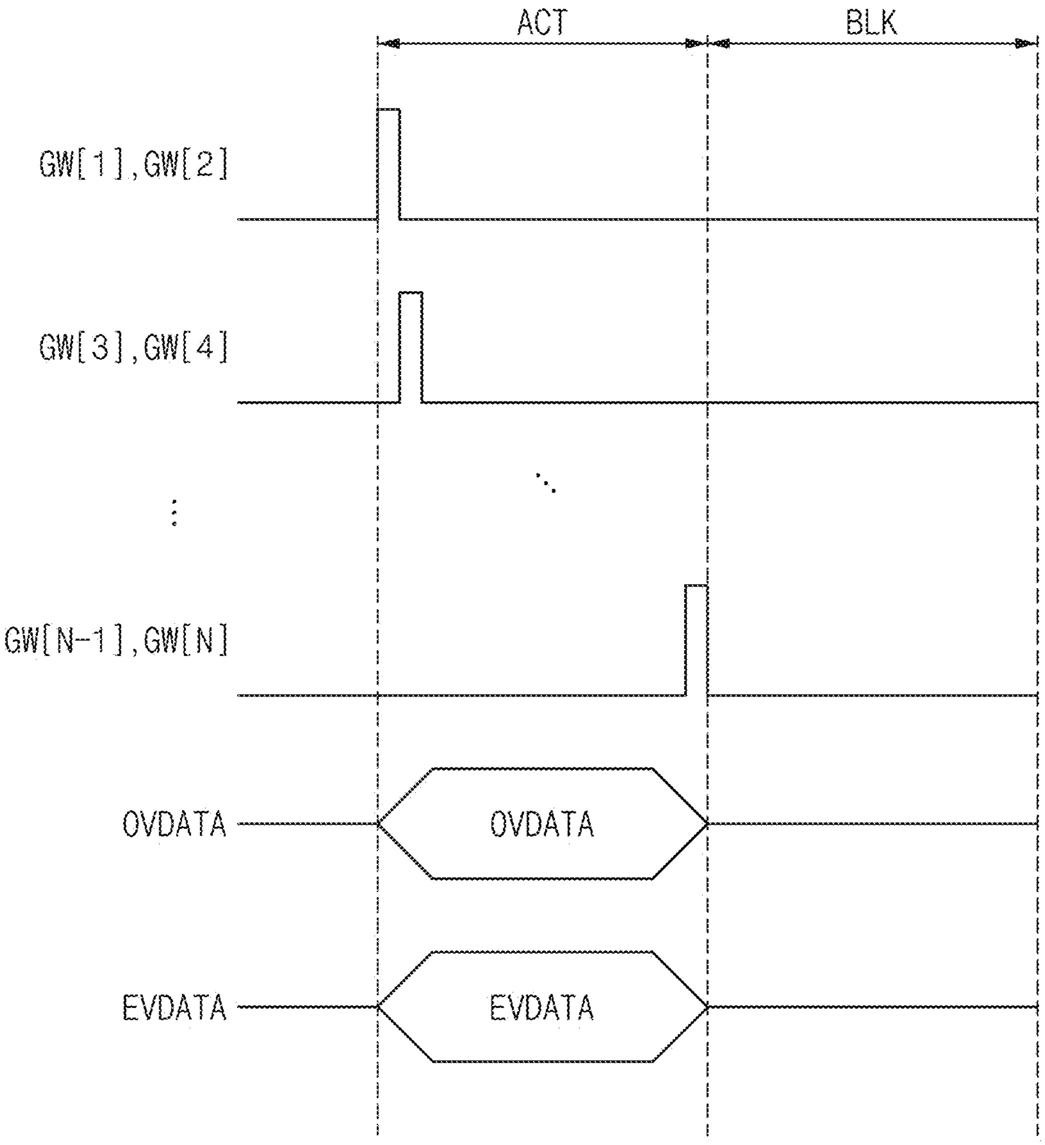
FIG. 5 is a timing diagram illustrating an operation of a display panel.
Figure 6:
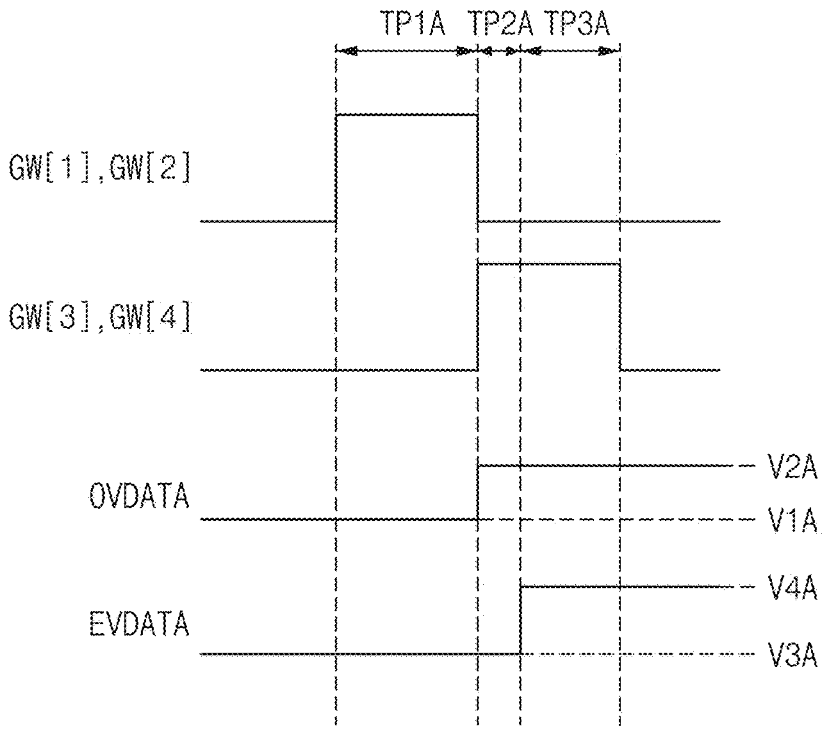
FIG. 6 is a timing diagram illustrating an operation of a display panel in an active period.

FIG. 5 is a timing diagram illustrating an operation of a display panel. FIG. 6 is a timing diagram illustrating an operation of a display panel in an active period ACT.

Referring to FIG. 1 to FIG. 6, the display panel 100 displays a frame of the input image data IMG during a frame period. The frame period may include an active period ACT and a blank period BLK. In the active period ACT, the write gate signals GW[1], GW[2], GW[3], GW[4] to GW[N−1] and GW[N] may be provided to the write gate transistors of the pixels PX. Each of the write gate signals GW[1], GW[2], GW[3], GW[4] to GW[N−1] and GW[N] may turn on corresponding write gate transistor of the pixels PX for the data voltage VDATA applied to the pixels PX to be transferred to the pixel circuit PC.

The active period ACT may include a first time period TP1A, a second time period TP2A and a third time period TP3A.

In the first time period TP1A, the first write gate signal GW[1] and the second write gate signal GW[2], also referred to as the first gate signal, may have an activation level, and the third write gate signal GW[3] and the fourth write gate signal GW[4], also referred to as the second gate signal, may have an inactivation level. In the first time period TP1A, the odd-numbered data voltage OVDATA may have a first voltage level V1A, and the even-numbered data voltage EVDATA may have a third voltage level V3A.

In the first time period TP1A, the odd-numbered data voltage OVDATA may be applied to a first pixel-row in response to the first write gate signal GW[1], and the even-numbered data voltage EVDATA may be applied to a second pixel-row in response to the second write gate signal GW[2].

In the second time period TP2A, the first write gate signal GW[1] and the second write gate signal GW[2] may have an inactivation level, and the third write gate signal GW[3] and the fourth write gate signal GW[4] may have an activation level. In the second time period TP2A, the odd-numbered data voltage OVDATA may have a second voltage level V2A, and the even-numbered data voltage EVDATA may maintain the third voltage level V3A.

In the second time period TP2A, the odd-numbered data voltage OVDATA may be applied to the third pixel-row in response to the third write gate signal GW[3], and the even-numbered data voltage EVDATA may be applied to the fourth pixel-row in response to the fourth write gate signal GW[4].

The data driver 500 may control the output timing of the odd-numbered data voltage OVDATA and the output timing of the even-numbered data voltage EVDATA differently. The second time period TP2A may correspond to an output delay between output timing of the even-numbered data voltage EVDATA and output timing of the odd-numbered data voltage OVDATA. Accordingly, in the second time period TP2A, the even-numbered data voltage EVDATA may maintain a previous even-numbered data voltage while the odd-numbered data voltage OVDATA transitions to different voltage level. For example, in the second time period TP2A, the even-numbered data voltage EVDATA may maintain the third voltage level V3A, while the odd-numbered data voltage OVDATA transitions from the first voltage level V1A to the second voltage level V2A.

In the third time period TP3A, the first write gate signal GW[1] and the second write gate signal GW[2] may have an inactivation level, and the third write gate signal GW[3] and the fourth write gate signal GW[4] may have an activation level. In the third time period TP3A, the odd-numbered data voltage OVDATA may maintain a second voltage level V2A, and the even-numbered data voltage EVDATA may transition from the third voltage level V3A to the fourth voltage level V4A.

In the third time period TP3A, the even-numbered data voltage EVDATA may be applied to the fourth pixel-row in response to the fourth write gate signal GW[4], and the fourth voltage level V4A may be applied to the fourth pixel-row in response to the fourth write gate signal GW[4].

When a data voltage transitions to a different level, a power voltage of the pixel PX may fluctuate due to a change of the data voltage. By distributing timings of applying data voltages to the data lines, the power voltage fluctuation, due to coupling with the change of the data voltage, may be reduced.

According to an embodiment, for distributing the timings of applying data voltages to the data lines, the even-numbered data voltage EVDATA may be changed after a first delay from a time point in which the odd-numbered data voltage OVDATA is changed. For example, referring to FIG. 6, after the first delay from the odd-numbered data voltage OVDATA is changed from the first voltage level V1A to the second voltage level V2A, the even-numbered data voltage EVDATA may be changed from the third voltage V3A to the fourth voltage level V4A. The first delay may be controlled by the data driver 500, and may correspond to time period TP2A of FIG. 6. Accordingly, a first timing in which the odd-numbered data voltage OVDATA is changed and a second timing in which the even-numbered data voltage EVDATA is changed may be different, thereby the timings of applying data voltages to the data lines may be distributed.

Because the first timing in which the odd-numbered data voltage OVDATA is changed may be different from the second timing in which the even-numbered data voltage EVDATA, the data voltage of the even-numbered data line may be changed after the data voltage of the odd-numbered data line is changed. By applying data voltages to the odd-numbered data line and the even-numbered data line at different timings, the timings of applying data voltages to the data lines may be distributed, and power voltage fluctuation may be reduced. Because the change of the first power voltage ELVDD may be reduced in a frame period, a driving reliability of the light emitting element EE may be improved. More particularly, an emission reliability of the light emitting element EE of the pixel PX may be improved, thereby a display quality of the display panel 100 may be improved.

Figure 7:
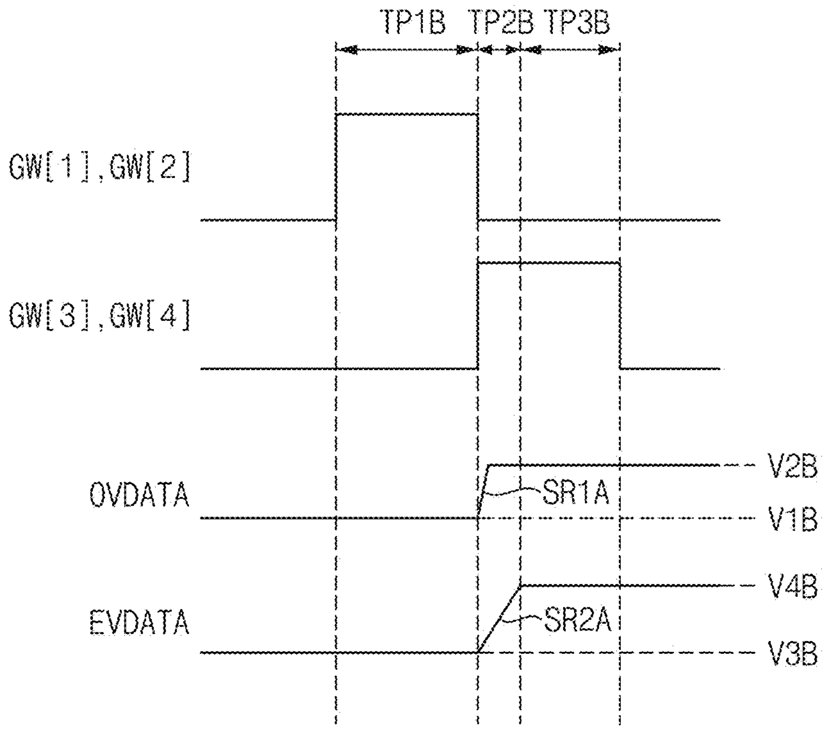
FIG. 7 is a timing diagram illustrating an operation of a display panel in an active period.

FIG. 7 is a timing diagram illustrating an operation of a display panel in an active period ACT.

Referring to FIG. 1 to FIG. 5 and FIG. 7, the active period ACT may include a first time period TP1B, a second time period TP2B and a third time period TP3B. According to an embodiment, by adjusting slew rates of data voltages applied to the data lines, the power voltage fluctuation, due to coupling with the change of the data voltage, may be reduced.

In the first time period TP1B, the first write gate signal GW[1] and the second write gate signal GW[2] may have an activation level, and the third write gate signal GW[3] and the fourth write gate signal GW[4] may have an inactivation level. In the first time period TP1B, the odd-numbered data voltage OVDATA may have a first voltage level V1B, and the even-numbered data voltage EVDATA may have a third voltage level V3B.

In the first time period TP1B, the odd-numbered data voltage OVDATA may be applied to the first pixel-row in response to the first write gate signal GW[1], and the even-numbered data voltage EVDATA may be applied to the second pixel-row in response to the second write gate signal GW[2].

In the second time period TP2B, the first write gate signal GW[1] and the second write gate signal GW[2] may have an inactivation level, and the third write gate signal GW[3] and the fourth write gate signal GW[4] may have an activation level. In the second time period TP2B, the odd-numbered data voltage OVDATA may be changed from the first voltage level V1B to a second voltage level V2B with a first slew rate SR1A, and the even-numbered data voltage EVDATA may be changed from the third voltage level V3B to a fourth voltage level V4B with a second slew rate SR2A.

The first slew rate SR1A may be greater than the second slew rate SR2A, and a change of the odd-numbered data voltage OVDATA may be faster than a change of the even-numbered data voltage EVDATA.

In the second time period TP2B, the odd-numbered data voltage OVDATA may be applied to the third pixel-row in response to the third write gate signal GW[3], and the even-numbered data voltage EVDATA may be applied to the fourth pixel-row in response to the fourth write gate signal GW[4]. The data driver 500 may control the first slew rate SR1A of the odd-numbered data voltage OVDATA and the second slew rate SR2A of the even-numbered data voltage EVDATA differently.

In the third time period TP3B, the first write gate signal GW[1] and the second write gate signal GW[2] may have an inactivation level, and the third write gate signal GW[3] and the fourth write gate signal GW[4] may have an activation level. In the third time period TP3B, the odd-numbered data voltage OVDATA may maintain a second voltage level V2B, and the even-numbered data voltage EVDATA may have a fourth voltage level V4B.

In the third time period TP3B, the even-numbered data voltage EVDATA may be applied to the fourth pixel-row in response to the fourth write gate signal GW[4], and the fourth voltage level V4B may be applied to the fourth pixel-row in response to the fourth write gate signal GW[4].

When a data voltage applied to a data line transitions to different level, a power voltage of the pixel PX may fluctuate due to a change of the data voltage. By adjusting slew rates of data voltages applied to the data lines differently, the power voltage, due to the coupling with the change of the data voltage, may be reduced.

According to an embodiment, for adjusting slew rates of data voltages applied to the data lines differently, the even-numbered data voltage EVDATA transitions to a different level slower than the odd-numbered data voltage OVDATA. For example, referring to FIG. 7, after the odd-numbered data voltage OVDATA is changed from the first voltage level V1B to the second voltage level V2B with the first slew rate SR1A, the even-numbered data voltage EVDATA may be changed from the third voltage V3B to the fourth voltage level V4B with the second slew rate SR2A. Because the first slew rate SR1A is greater than the second slew rate SR2A, timings of applying data voltages to the data lines is distributed and the power voltage fluctuation, due to the coupling with the change of the data voltage, may be reduced. The first slew rate SR1A and the second slew rate SR2A may be adjusted by the data driver 500, and may be changed frame by frame or pixel-row by pixel-row.

Because the first slew rate SR1A may be greater than the second slew rate SR2A, the change of the odd-numbered data voltage OVDATA may be faster than the change of the even-numbered data voltage EVDATA. By adjusting slew rates of data voltages applied to the data lines differently, the coupling voltage of the first power voltage ELVDD may be reduced, and a change of the first power voltage ELVDD may be reduced. Therefore, the first power voltage ELVDD may be less fluctuated due to the coupling with the change of the data voltage. Because the first power voltage ELVDD fluctuation may be reduced in a frame period, a driving reliability of the light emitting element EE may be improved. More particularly, an emission reliability of the light emitting element EE of the pixel PX may be improved, thereby a display quality of the display panel 100 may be improved.

Figure 8:
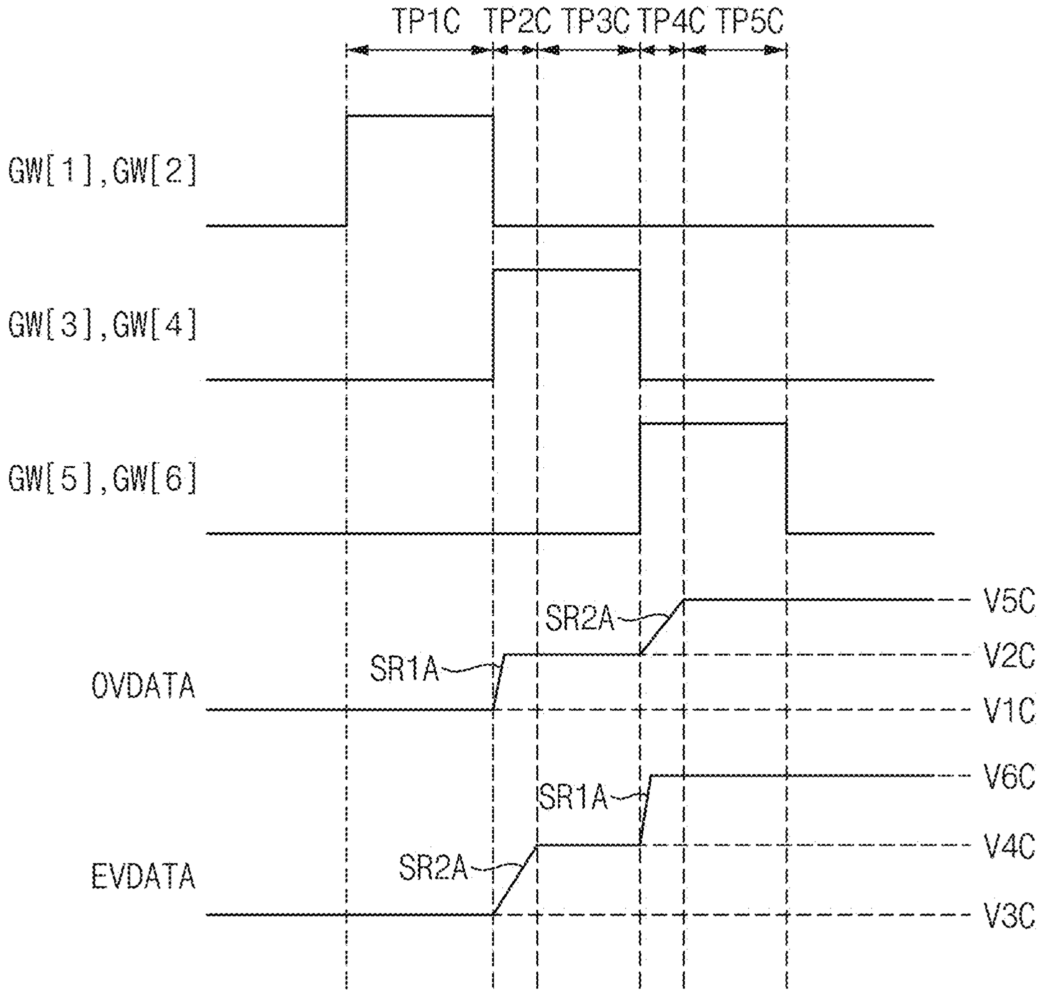
FIG. 8 is a timing diagram illustrating an operation of a display panel in an active period.

FIG. 8 is a timing diagram of an example of periods included in an active period ACT of FIG. 5.

Referring to FIG. 1 to FIG. 5 and FIG. 8, the active period ACT may include a first time period TP1C, a second time period TP2C, a third time period TP3C, a fourth time period TP4C and a fifth time period TP5C. According to an embodiment, by adjusting slew rates of data voltages applied to the data lines differently in different pixel-rows, the first power voltage ELVDD fluctuation, due to coupling with the change of the data voltage, may be reduced.

In the first time period TP1C, the first write gate signal GW[1] and the second write gate signal GW[2] may have an activation level, and the third write gate signal GW[3] and the fourth write gate signal GW[4] may have an inactivation level. In the first time period TP1C, the odd-numbered data voltage OVDATA may have a first voltage level V1C, and the even-numbered data voltage EVDATA may have a third voltage level V3C.

In the first time period TP1C, the odd-numbered data voltage OVDATA may be applied to the first pixel-row in response to the first write gate signal GW[1], and the even-numbered data voltage EVDATA may be applied to the second pixel-row in response to the second write gate signal GW[2].

In the second time period TP2C, the first write gate signal GW[1] and the second write gate signal GW[2] may have an inactivation level, and the third write gate signal GW[3] and the fourth write gate signal GW[4] may have an activation level. In the second time period TP2C, the odd-numbered data voltage OVDATA may be changed from the first voltage level V1C to a second voltage level V2C with the first slew rate SR1A, and the even-numbered data voltage EVDATA may be changed from the third voltage level V3C to a fourth voltage level V4C with a second slew rate SR2A.

In an embodiment, the first slew rate SR1A may be greater than the second slew rate SR2A, and a change of the odd-numbered data voltage OVDATA may be faster than a change of the even-numbered data voltage EVDATA.

In the second time period TP2C, the odd-numbered data voltage OVDATA may be applied to the third pixel-row in response to the third write gate signal GW[3], and the even-numbered data voltage EVDATA may be applied to the fourth pixel-row in response to the fourth write gate signal GW[4]. The data driver 500 may control the first slew rate SRA1 of the odd-numbered data voltage OVDATA and the second slew rate SRA2 of the even-numbered data voltage EVDATA differently.

In the third time period TP3C, the first write gate signal GW[1] and the second write gate signal GW[2] may have an inactivation level, and the third write gate signal GW[3] and the fourth write gate signal GW[4] may have an activation level. In the third time period TP3C, the odd-numbered data voltage OVDATA may maintain a second voltage level V2C, and the even-numbered data voltage EVDATA may have a fourth voltage level V4C.

In the third time period TP3C, the even-numbered data voltage EVDATA may be applied to the fourth pixel-row in response to the fourth write gate signal GW[4], and the fourth voltage level V4C may be applied to the fourth pixel-row in response to the fourth write gate signal GW[4].

In the fourth time period TP4C, the first write gate signal GW[1], the second write gate signal GW[2], the third write gate signal GW[3] and the fourth write gate signal GW[4] may have an inactivation level, and the fifth write gate signal GW[5] and the sixth write gate signal GW[6] may have an activation level. In the fourth time period TP4C, the odd-numbered data voltage OVDATA may be changed from the second voltage level V2C to a fifth voltage level V5C, and the odd-numbered data voltage OVDATA may be changed from the second voltage level V2C to the fifth voltage level V5C with the second slew rate SR2A, and the even-numbered data voltage EVDATA may be changed from the fourth voltage level V4C to a sixth voltage level V6C with the first slew rate SR1A.

Referring to FIG. 8, in the second time period TP2C, the odd-numbered data voltage OVDATA may be changed with the first slew rate SR1A, and the even-numbered data voltage EVDATA may be changed with the second slew rate SR2A. In the fourth time period TP4C, unlike in the second time period TP2C, the odd-numbered data voltage OVDATA may be changed with the second slew rate SR2A, and the even-numbered data voltage EVDATA may be changed with the first slew rate SR1A. Because, in the active period ACT, slew rates of the odd-numbered data voltage OVDATA and the even-numbered data voltage EVDATA are adjusted differently in different pixels PX, a reliability of the data voltage VDATA applied to the data line DL may be improved. For example, the slew rates with which the odd-numbered data voltage OVDATA transition, may be increased or decreased in different pixels PX, and the change of the odd-numbered data voltage OVDATA may be differently delayed in different pixels PX. The slew rates with which the even-numbered data voltage OVDATA transition, may be increased or decreased in different pixels PX, and the even-numbered data voltage EVDATA may be differently delayed in different pixels PX. By adjusting slew rates of data voltages applied to the data lines differently in different pixels PX, the power voltage coupling with may be less affected by coupling with the change of the data voltage, the reliability of the data voltage VDATA applied to the pixel PX may be improved.

Figure 9:
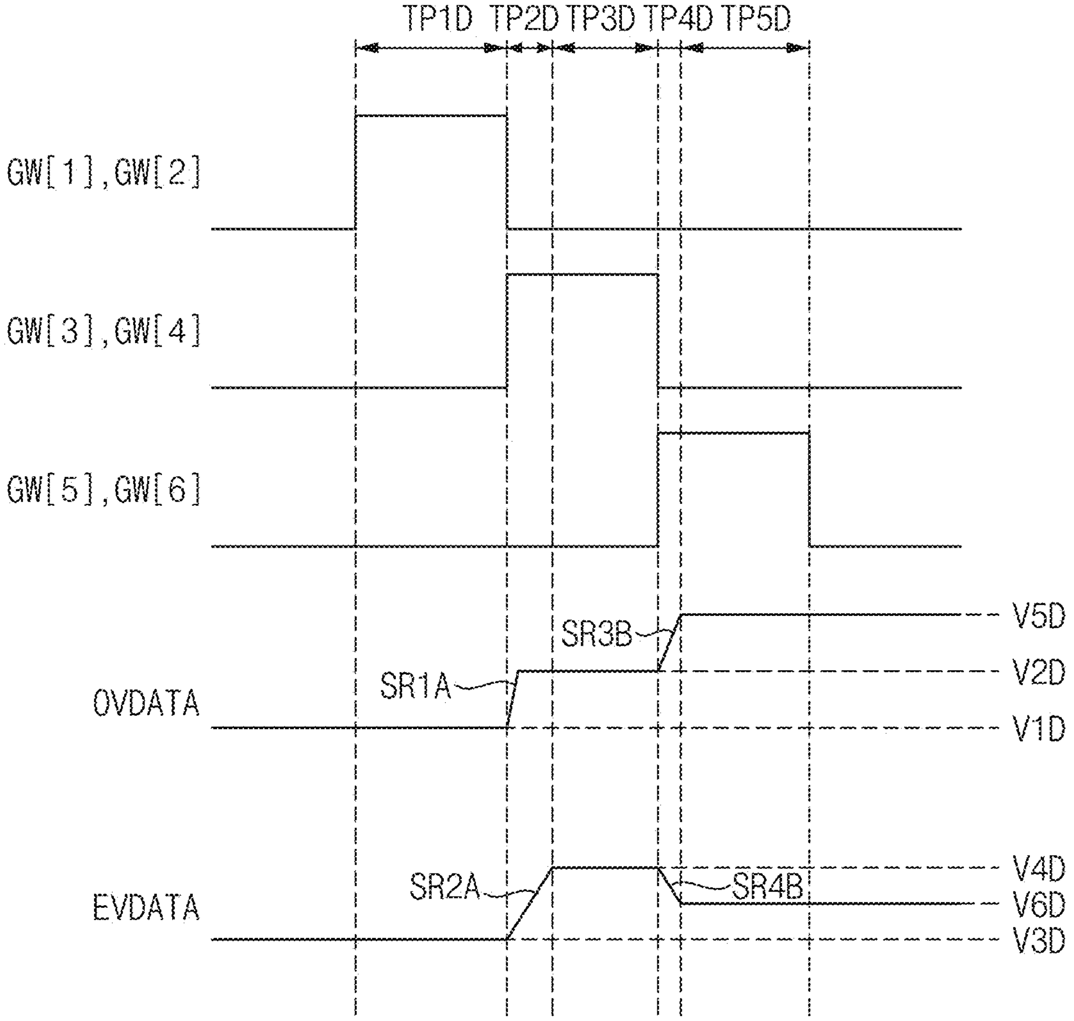
FIG. 9 is a timing diagram illustrating an operation of a display panel in an active period.

FIG. 9 is a timing diagram illustrating an operation of a display panel in an active period.

Referring to FIG. 1 to FIG. 5 and FIG. 9, the active period ACT may include a first time period TP1D, a second time period TP2D, a third time period TP3D, a fourth time period TP4D and a fifth time period TP5D. According to an embodiment, by adjusting slew rates of data voltages applied to the data lines and applying opposite data voltages to the data lines, the power voltage coupling with may be less affected by coupling with the change of the data voltage.

In the first time period TP1D, the first write gate signal GW[1] and the second write gate signal GW[2] may have an activation level, and the third write gate signal GW[3] and the fourth write gate signal GW[4] may have an inactivation level. In the first time period TP1D, the odd-numbered data voltage OVDATA may have a first voltage level V1D, and the even-numbered data voltage EVDATA may have a third voltage level V3D.

In the first time period TP1D, the odd-numbered data voltage OVDATA may be applied to the first pixel-row in response to the first write gate signal GW[1], and the even-numbered data voltage EVDATA may be applied to the second pixel-row in response to the second write gate signal GW[2].

In the second time period TP2D, the first write gate signal GW[1] and the second write gate signal GW[2] may have an inactivation level, and the third write gate signal GW[3] and the fourth write gate signal GW[4] may have an activation level. In the second time period TP2D, the odd-numbered data voltage OVDATA may be changed from the first voltage level V1D to a second voltage level V2D, with the first slew rate SR1A, and the even-numbered data voltage EVDATA may be changed from the third voltage level V3D to a fourth voltage level V4D with a second slew rate SR2A.

The first slew rate SR1A may be greater than the second slew rate SR2A, and a change of the odd-numbered data voltage OVDATA may be faster than a change of the even-numbered data voltage EVDATA.

In the second time period TP2D, the odd-numbered data voltage OVDATA may be applied to the third pixel-row in response to the third write gate signal GW[3], and the even-numbered data voltage EVDATA may be applied to the fourth pixel-row in response to the fourth write gate signal GW[4]. The data driver 500 may control the first slew rate SRA1 of the odd-numbered data voltage OVDATA and the second slew rate SRA2 of the even-numbered data voltage EVDATA differently.

In the third time period TP3D, the first write gate signal GW[1] and the second write gate signal GW[2] may have an inactivation level, and the third write gate signal GW[3] and the fourth write gate signal GW[4] may have an activation level. In the third time period TP3D, the odd-numbered data voltage OVDATA may maintain a second voltage level V2D, and the even-numbered data voltage EVDATA may have a fourth voltage level V4D.

In the third time period TP3D, the even-numbered data voltage EVDATA may be applied to the fourth pixel-row in response to the fourth write gate signal GW[4], and the fourth voltage level V4D may be applied to the fourth pixel-row in response to the fourth write gate signal GW[4].

In the fourth time period TP4D, the first write gate signal GW[1], the second write gate signal GW[2], the third write gate signal GW[3] and the fourth write gate signal GW[4] may have an inactivation level, and the fifth write gate signal GW[5] and the sixth write gate signal GW[6] may have an activation level. In the fourth time period TP4D, the odd-numbered data voltage OVDATA may be changed from the second voltage level V2D to a fifth voltage level V5D with a third slew rate SR3B, and the even-numbered data voltage EVDATA may be changed from the fourth voltage level V4D to a sixth voltage level V6D with a fourth slew rate SR4B. The third slew rate SR3B and the fourth slew rate SR4B may be different from the first slew rate SR1A and the second slew rate SR2A.

Referring to FIG. 9, in the second time period TP2D, the odd-numbered data voltage OVDATA may be changed with the first slew rate SR1A, and the even-numbered data voltage EVDATA may be changed with the second slew rate SR2A. Additionally, in the fourth time period TP4D, the odd-numbered data voltage OVDATA may be increased from the second voltage level V2D to the fifth voltage level V5D, and the even-numbered data voltage EVDATA may be decreased from the fourth voltage level V4D to the sixth voltage level V6D. Accordingly, in the active period ACT, voltage changes of the odd-numbered data voltage OVDATA and the even-numbered data voltage EVDATA are in opposite direction and may cancel the coupling effect with the first power voltage ELVDD. Accordingly, a reliability of the data voltage VDATA applied to the data line DL may be improved. For example, the slew rates, with which the odd-numbered data voltage OVDATA transition, may be increased or decreased in different pixels PX, and the change of the even-numbered data voltage EVDATA may be differently delayed in different pixels PX. By adjusting slew rates of the odd-numbered data voltage OVDATA and the even-numbered data voltage OVDATA differently, the reliability of the data voltage VDATA applied to the pixel PX may be improved.

Additionally, in the fourth time period TP4D, the odd-numbered data voltage OVDATA may be increased from the second voltage level V2D to the fifth voltage level V5D, and the even-numbered data voltage EVDATA may be decreased from the fourth voltage level V4D to the sixth voltage level V6D. Accordingly, in the active period ACT, voltage changes of the odd-numbered data voltage OVDATA and the even-numbered data voltage EVDATA are in opposite direction and may cancel the coupling effect with the first power voltage ELVDD. A slew rate SR3B of the odd-numbered data voltage OVDATA and a slew rate SR4B of the even-numbered data voltage EVDATA may be adjusted according to the data voltage transition directions of the odd-numbered data voltage OVDATA and the even-numbered data voltage EVDATA. By adjusting slew rates of data voltages applied to the data lines differently for different data voltage transition directions, the first power voltage ELVDD fluctuation, due to coupling with the change of the data voltage, may be reduced.

Figure 10:
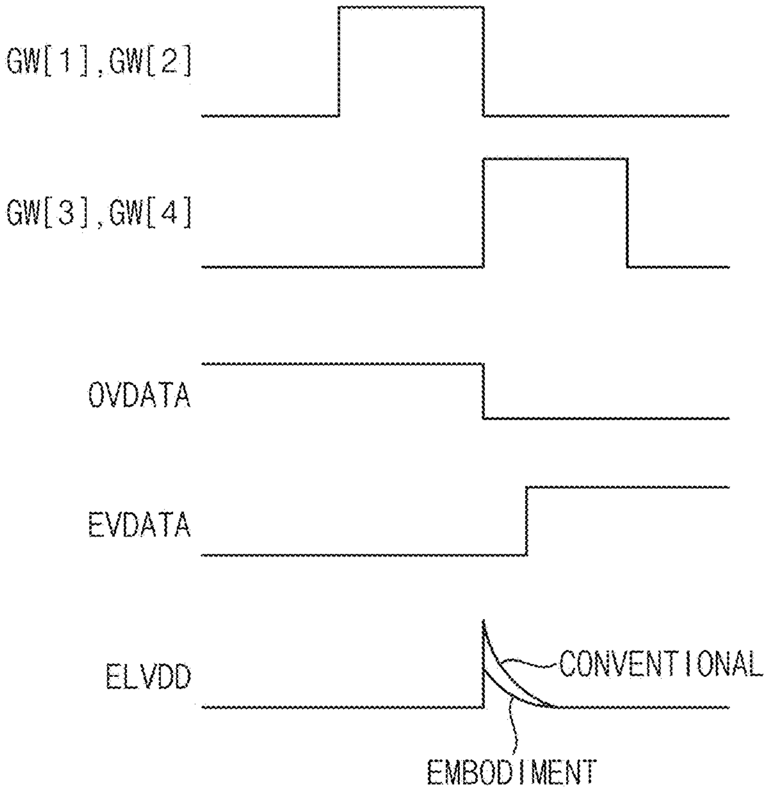
FIG. 10 is a timing diagram illustrating power voltage fluctuation due to coupling with a change of a data voltage.

FIG. 10 is a timing diagram illustrating power voltage fluctuation due to coupling with a change of a data voltage.

Referring to FIG. 1 to FIG. 10, the even-numbered data voltage EVDATA may be changed after a first delay from a time point in which the odd-numbered data voltage OVDATA is changed. For example, referring to FIG. 10, after the first delay from the odd-numbered data voltage OVDATA is changed from a first voltage level to a second voltage level, the even-numbered data voltage EVDATA may be changed from a third voltage level and a fourth voltage level. The first delay of the even-numbered data voltage EVDATA may be controlled by the data driver 500. Accordingly, a first timing in which the odd-numbered data voltage OVDATA is changed and a second timing in which the even-numbered data voltage EVDATA is changed may be differently controlled by the data driver 500.

Because the first timing in which the odd-numbered data voltage OVDATA is changed may be different from the second timing in which the even-numbered data voltage EVDATA, a data voltage of the even-numbered data line may be changed after a data voltage of the odd-numbered data line is changed, thereby the first power voltage ELVDD fluctuation, due to voltage change in the data voltage VDATA, may be reduced. Because the first power voltage ELVDD fluctuation may be reduced in a frame period, a driving reliability of the light emitting element EE may be improved. More particularly, an emission reliability of the light emitting element EE of the pixel PX may be improved, thereby a display quality of the display panel 100 may be improved.

Figure 11:
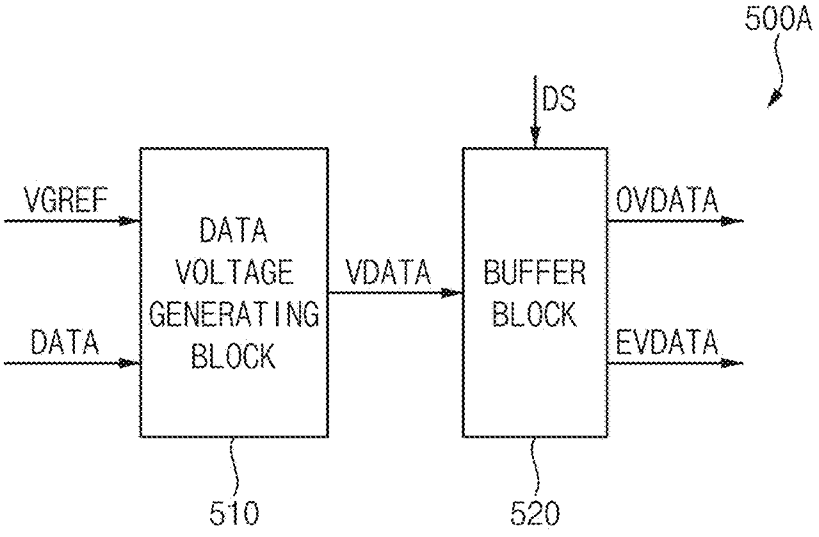
FIG. 11 is a block diagram illustrating a data driver included in a display device.

FIG. 11 is a block diagram illustrating an example of a data driver 500 included in a display device 1.

Referring to FIG. 11, a data driver 500A may include a data voltage generating block 510 and a buffer block 520.

The data voltage generating block 510 may receive the gamma reference voltage VGREF and the data signal DATA, and generate the data voltage VDATA based on the gamma reference voltage VGREF and the data signal DATA. The data voltage generating block 510 may provide the data voltage VDATA to the buffer block 520.

The buffer block 520 may receive the data voltage VDATA and the delay signal DS. The buffer block 520 may output the odd-numbered data voltage OVDATA and the even-numbered data voltage EVDATA based on the data voltage VDATA. The buffer block 520 may control an output delay of the odd-numbered data voltage OVDATA and the even-numbered data voltage EVDATA based on the data signal DS.

In an embodiment, the buffer block 520 may control an output timing of the even-numbered data voltage EVDATA. For example, after the buffer block 520 outputs the odd-numbered data voltage OVDATA, the buffer block 520 may output the even-numbered data voltage EVDATA. In an embodiment, the buffer block 520 may control an output timing of the odd-numbered data voltage OVDATA. For example, after the buffer block 520 outputs the even-numbered data voltage EVDATA, the buffer block 520 may output the odd-numbered data voltage OVDATA.

In an embodiment, the buffer block 520 may control a slew rate of a change of the even-numbered data voltage EVDATA. For example, when the even-numbered data voltage EVDATA is changed, the buffer block 520 may change a slew rate of a change of the even-numbered data voltage EVDATA. In an embodiment, the buffer block 520 may control a slew rate of a change of the odd-numbered data voltage OVDATA. For example, when the odd-numbered data voltage OVDATA is changed, the buffer block 520 may change a slew rate of a change of the odd-numbered data voltage OVDATA.

Figure 12:
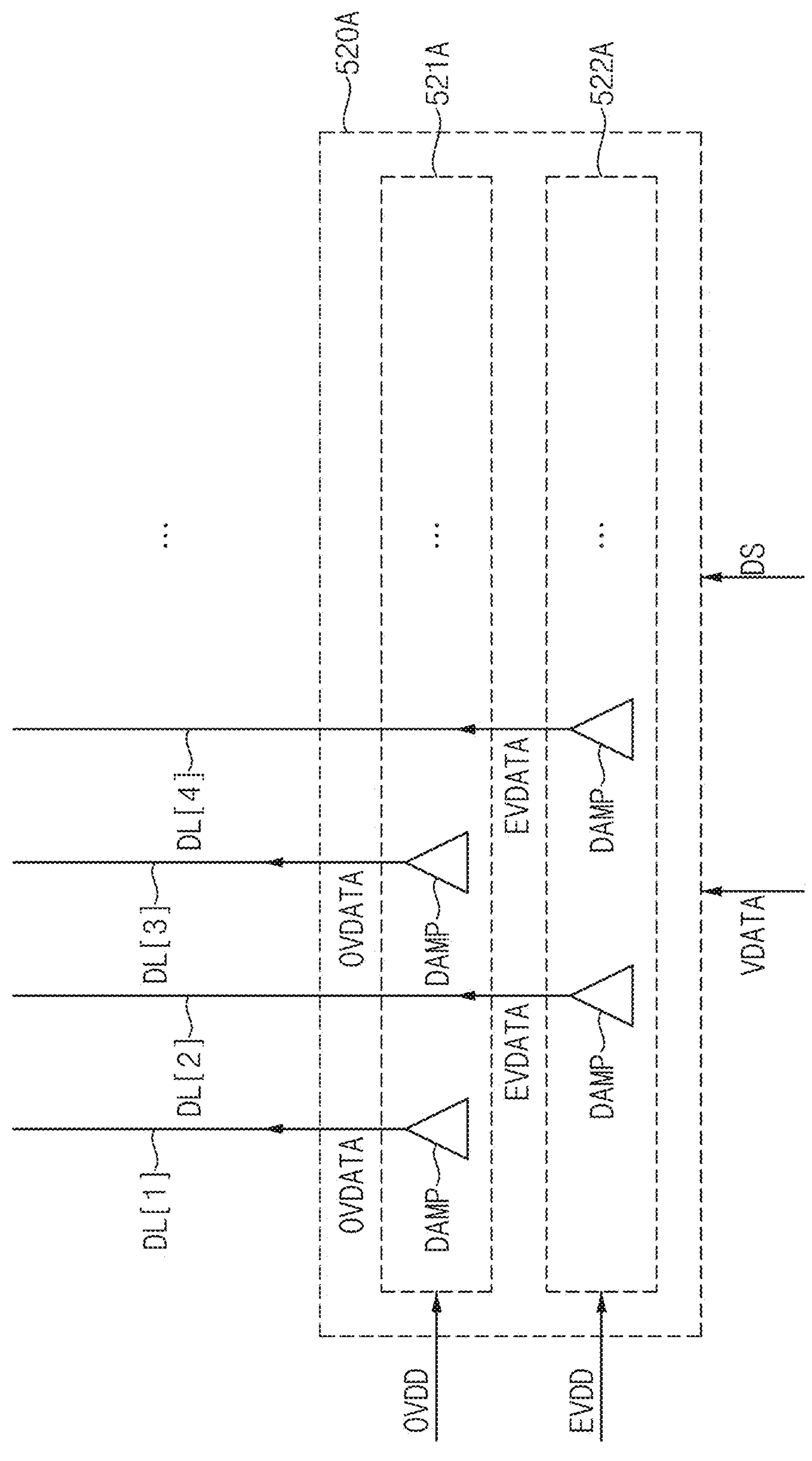
FIG. 12 is a block diagram illustrating a buffer block included in a data driver.

FIG. 12 is a block diagram illustrating a buffer block included in a data driver.

Referring to FIG. 1 to FIG. 12, a buffer block 520A may include a first amplifying block 521A and a second amplifying block 522A. The first amplifying block 521A may include a plurality of data amplifiers DAMP. The second amplifying block 522A may include a plurality of data amplifiers DAMP. The first amplifying block 521A may be referred to as an odd-numbered amplifying block, and the second amplifying block 522A may be referred to as an even-numbered amplifying block. The data amplifier DAMP may be an operational amplifier.

The first amplifying block 521A may be connected to the odd-numbered data lines. For example, the first amplifying block 521A may be connected to the first data line DL[1] and the third data line DL[3], and output the odd-numbered data voltage OVDATA to the odd-numbered data lines. The data amplifiers DAMP of the first amplifying block 521A may receive a first bias voltage OVDD. The data amplifiers DAMP of the first amplifying block 521A may generate the odd-numbered data voltage OVDATA based on the data voltage VDATA and the first bias voltage OVDD.

The second amplifying block 522A may be connected to the even-numbered data lines. For example, the second amplifying block 522A may be connected to the second data line DL[2] and the fourth data line DL[4], and output the even-numbered data voltage EVDATA to the even-numbered data lines. The data amplifiers DAMP of the second amplifying block 522A may receive a second bias voltage EVDD. The data amplifiers DAMP of the second amplifying block 522A may generate the even-numbered data voltage EVDATA based on the data voltage VDATA and the second bias voltage EVDD.

The first bias voltage OVDD applied to the first amplifying block 521A may be different depending on the slew rate of the odd-numbered data voltage OVDATA. For example, when the odd-numbered data voltage OVDATA is changed with a first slew rate, the first bias voltage OVDD may have a first voltage level, and when the odd-numbered data voltage OVDATA is changed with a second slew rate, the first bias voltage OVDD may have a second voltage level lower than the first voltage level. When a second voltage level is lower than the first voltage level, the second slew rate is controlled to be smaller than the first slew rate.

The second bias voltage EVDD applied to the second amplifying block 522A may be different depending on the slew rate of the even-numbered data voltage EVDATA. For example, when the even-numbered data voltage EVDATA is changed with a first slew rate, the second bias voltage EVDD may have a first voltage level, and when the even-numbered data voltage EVDATA is changed with a second, the second bias voltage EVDD may have a second voltage level lower than the first voltage level. When a second voltage level is lower than the first voltage level, the second slew rate is controlled to be smaller than the first slew rate.

In an embodiment, the bias voltages OVDD and EVDD applied to the data amplifier DAMP may be changed. The bias voltages OVDD and EVDD applied to the data amplifier DAMP may be changed, so that a slew rate of a change of the data voltages OVDATA and EVDATA outputted from the data amplifiers DAMP may be controlled. The slew rate of a change of the data voltages OVDATA and EVDATA outputted from the data amplifiers DAMP may be controlled, so that the timing in which the odd-numbered data voltage OVDATA is changed may be different from the timing in which the even-numbered data voltage EVDATA. Accordingly, a voltage of the even-numbered data line may be changed after a voltage of the odd-numbered data line is changed. The voltage of the even-numbered data line may be changed after the voltage of the odd-numbered data line is changed, so that a coupling voltage of power voltage may be reduced. For example, the coupling voltage may be a changed voltage value at which the first power voltage ELVDD is coupled by a change in the data voltage VDATA. The coupling voltage of the first power voltage ELVDD may be reduced, so that a change of the first power voltage ELVDD may be reduced. In a frame period, the change of the first power voltage ELVDD may be reduced, so that a driving reliability of the light emitting element EE may be improved. For example, an emission reliability of the light emitting element EE of the pixel PX may be improved. Accordingly, a display quality of the display panel 100 may be improved.

Figure 13:
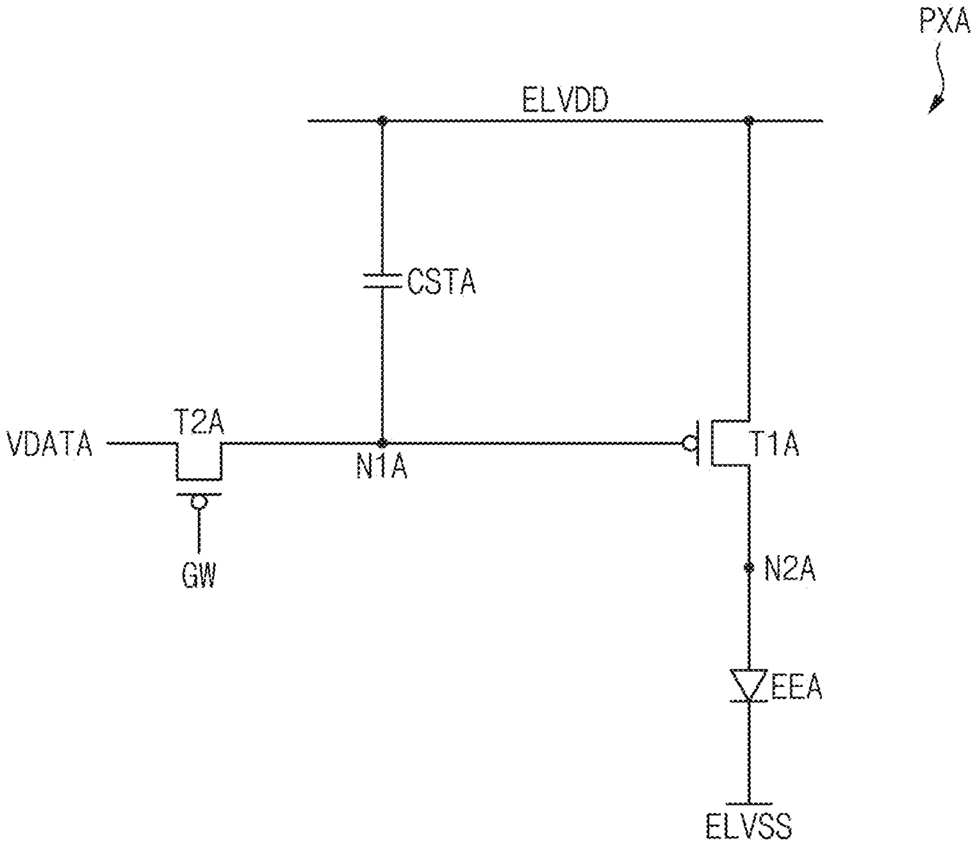
FIG. 13 is a circuit diagram illustrating a pixel included in a display panel.

FIG. 13 is a circuit diagram illustrating a pixel PX included in a display panel.

Referring to FIG. 1 and FIG. 13, a pixel PXA may include a first transistor T1A, a second transistor T2A, a storage capacitor CSTA and a light emitting element EEA.

The first transistor T1A may include a control electrode connected to a first node N1A, a first electrode receiving the first power voltage ELVDD and a second electrode connected to a second node N2A. The first transistor T1A may generate a driving current based on a voltage of the first node N1A. The first transistor T1A may be referred to as a driving transistor.

The second transistor T2A may include a control electrode receiving the write gate signal GW, a first electrode receiving the data voltage VDATA and a second electrode connected to the first node N1A. The second transistor T2A may apply the data voltage VDATA to the first node N1A in response to the write gate signal GW. The second transistor T2A may be referred to as a write gate transistor. When the write gate signal GW has an activation level, the second transistor T2A may be turned on, and when the write gate signal GW has an inactivation level, the second transistor T2A may be turned off.

The storage capacitor CSTA may include a first electrode receiving the first power voltage ELVDD and a second electrode connected to the first node N1A. The storage capacitor CSTA may store a voltage of the first node N1A.

The light emitting element EEA may include a first electrode connected to the second node N2A and a second electrode receiving a second power voltage ELVSS. The light emitting element EEA may emit light based on the driving current.

Figure 14:
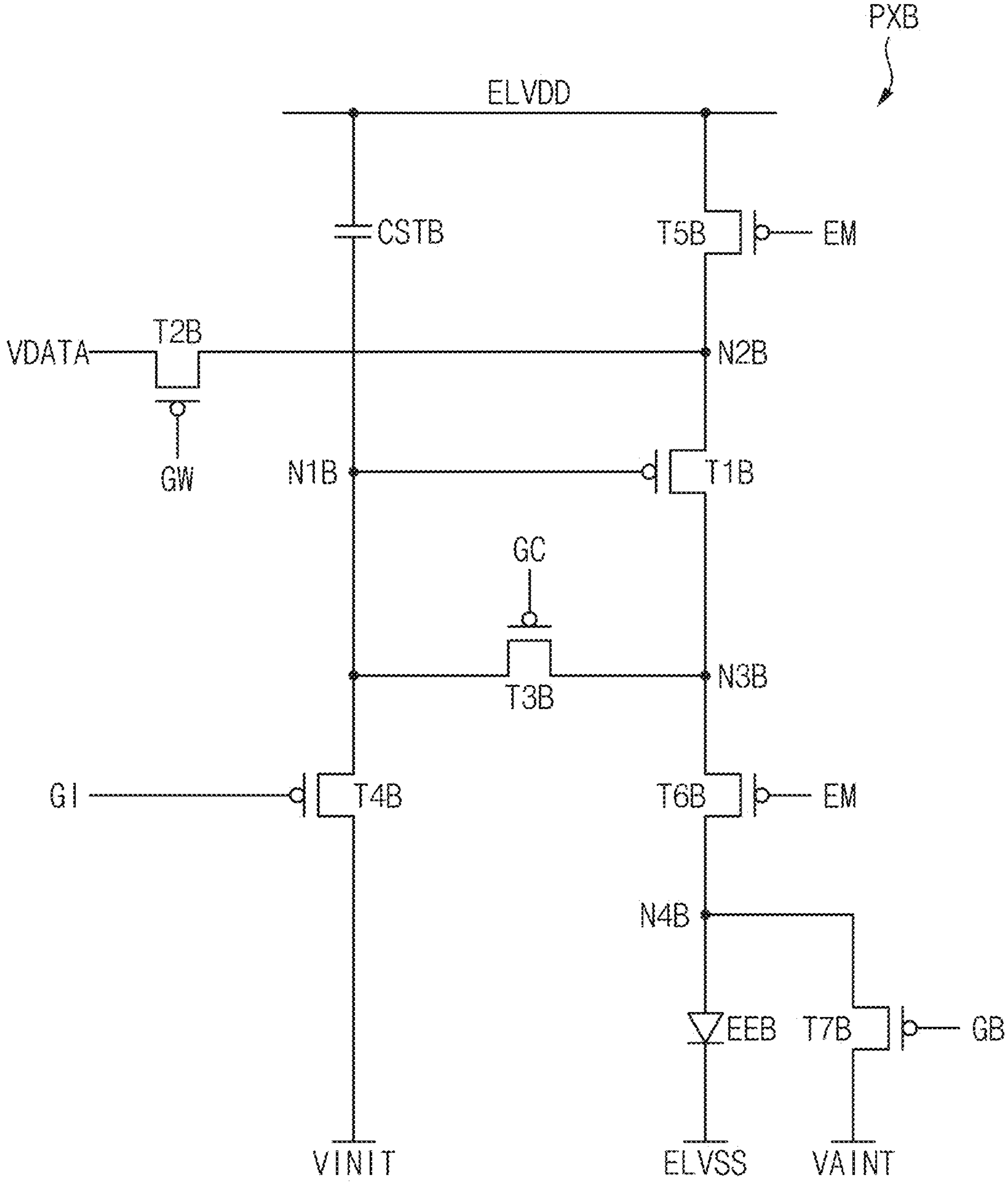
FIG. 14 is a circuit diagram illustrating a pixel included in a display panel.

FIG. 14 is a circuit diagram illustrating a pixel PX included in a display panel.

Referring to FIG. 1 and FIG. 14, a pixel PXB may include a first transistor T1B, a second transistor T2B, a third transistor T3B, a fourth transistor T4B, a fifth transistor T5B, a sixth transistor T6B, a seventh transistor T7B, a storage capacitor CSTB and the light emitting element EEB.

The first transistor T1B may include a control electrode connected to a first node N1B, a first electrode connected to a second node N2B and a second electrode connected to a third node N3B. The first transistor T1B may generate a driving current based on a voltage of the first node N1B. The first transistor T1B may be referred to as the driving transistor.

The second transistor T2B may include a control electrode receiving a write gate signal GW, a first electrode receiving the data voltage VDATA and a second electrode connected to the second node N2B. The second transistor T2B may apply the data voltage VDATA to the second node N2B in response to the write gate signal GW. The second transistor T2B may be referred to as the write gate transistor. When the write gate signal GW has an activation level, the second transistor T2B may be turned on, and when the write gate signal GW has an inactivation level, the second transistor T2B may be turned off.

The third transistor T3B may include a control electrode receiving the compensation gate signal GC, a first electrode connected to the third node N3B and a second electrode connected to the first node N1B. The third transistor T3B may connect the first node N1B and the third node N3B in response to the compensation gate signal GC. The third transistor T3B may operate as a diode to be connected with the first transistor T1B in response to the compensation gate signal GC. The third transistor T3B may be referred to as the compensation transistor.

The fourth transistor T4B may include a control electrode receiving the initialization gate signal GI, a first electrode receiving the initialization voltage VINIT and a second electrode connected to the first node N1B. The fourth transistor T4B may apply the initialization voltage VINIT to the first node N1B in response to the initialization gate signal GI. The fourth transistor T4B may be referred to as an initialization transistor.

The fifth transistor T5B may include a control electrode receiving the emission signal EM, a first electrode receiving the high power voltage ELVDD and a second electrode connected to the second node N2B. The fifth transistor T5B may apply the high power voltage ELVDD to the second node N2B in response to the emission signal EM. the fifth transistor T5B may be referred to as a first emission transistor.

The sixth transistor T6B may include a control electrode receiving the emission signal EM, a first electrode connected to the third node N3B and a second electrode connected to a fourth node N4B. The sixth transistor T6B may connect the third node N3B and the fourth node N4B in response to the emission signal EM. The sixth transistor T6B may be referred to as a second emission transistor.

The seventh transistor T7B may include a control electrode receiving the bias gate signal GB, a first electrode receiving the light emitting element initialization voltage VAINT and a second electrode connected to the fourth node N4B. The seventh transistor T7B may apply the light emitting element initialization voltage VAINT to the fourth node N4B in response to the initialization gate signal GB.

The storage capacitor CSTB may include a first electrode receiving the high power voltage ELVDD and a second electrode connected to the first node N1B. The storage capacitor CSTB may store a voltage of the first node N1B.

The light emitting element EEB may include a first electrode connected to the fourth node N4B and a second electrode receiving the low power voltage ELVSS. The light emitting element EEB may emit light based on the driving current.

Figure 15:
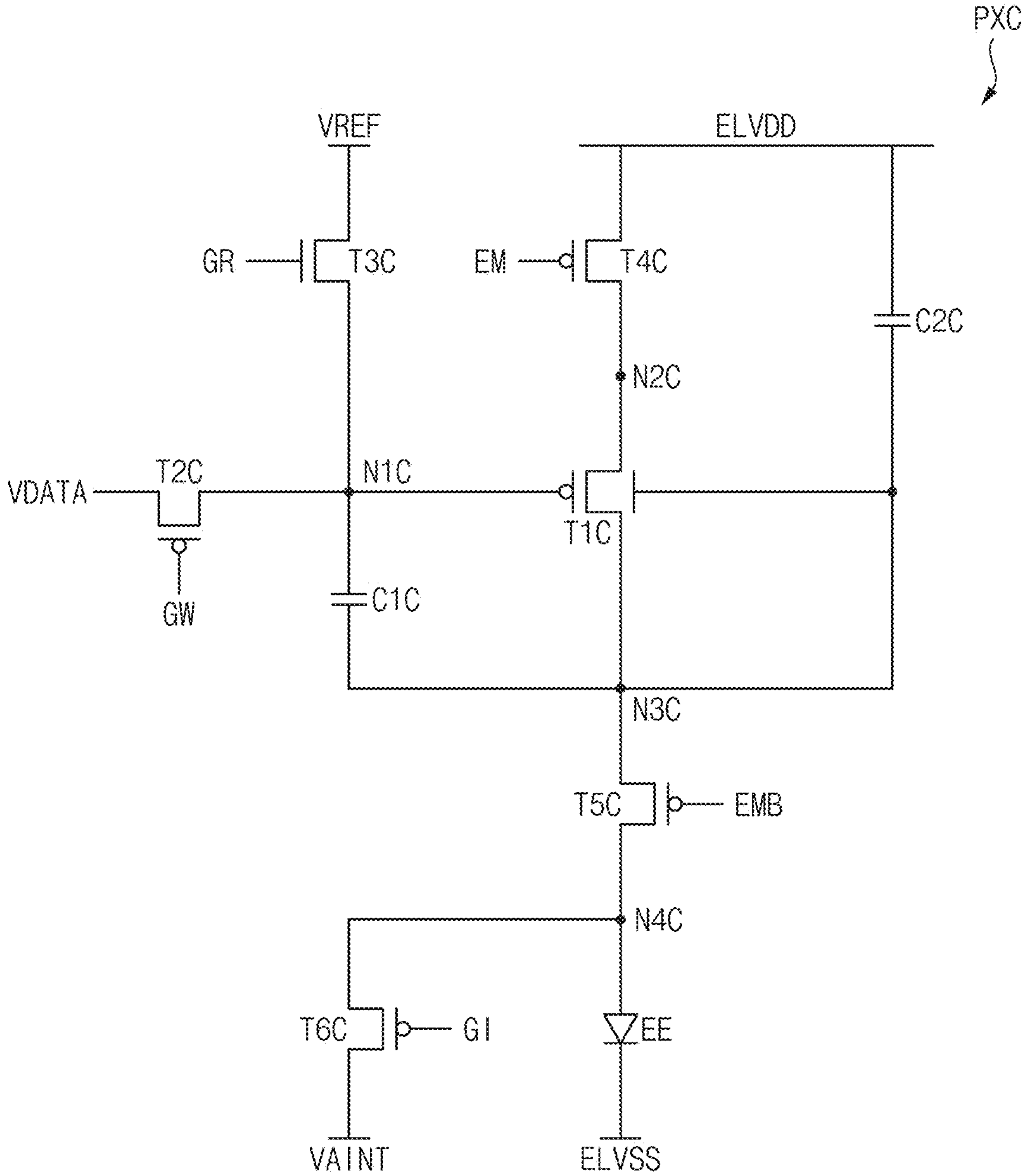
FIG. 15 is a circuit diagram illustrating a pixel included in a display panel.

FIG. 15 is a circuit diagram a pixel PX included a display panel.

Referring to FIG. 1 and FIG. 15, a pixel PXC may include a first transistor T1C, a second transistor T2C, a third transistor T3C, a fourth transistor T4C, a fifth transistor T5C, a sixth transistor T6C, a first capacitor C1C and the light emitting element EE. The pixel PXC may further include a second capacitor C2C.

The first transistor T1C may include a control electrode connected to a first node N1C, a first electrode connected to a second node N2C and a second electrode connected to a third node N3C. The first transistor T1C may generate the driving current based on a voltage of the first node N1C. The first transistor T1C may further include a second control electrode connected to the third node N3C. The first transistor T1C may be referred to as the driving transistor. Although, the first transistor T1C is implemented in a P-type transistor, the first transistor T1C may be implemented in an N-type transistor.

The second transistor T2C may include a control electrode receiving the write gate signal GW, a first electrode receiving the data voltage VDATA and a second electrode connected to the first node N1C. The second transistor T2C may apply the data voltage VDATA to the first node N1C in response to the write gate signal GW. The second transistor T2C may be referred to as the write gate transistor.

The third transistor T3C may include a control electrode receiving a reset gate signal GR, a first electrode receiving a pixel reference voltage VREF and a second electrode connected to the first node N1C. The third transistor T3C may apply the pixel reference voltage VREF to the first node N1C in response to the reset gate signal GR. The third transistor T3C may be referred to as the initialization transistor.

The fourth transistor T4C may include a control electrode receiving an emission signal EM, a first electrode receiving the first power voltage ELVDD and a second electrode connected to the second node N2C. The fourth transistor T4C may apply the first power voltage ELVDD to the second node N2C in response to the emission signal EM. The fourth transistor T4C may be referred to as a first emission transistor.

The fifth transistor T5C may include a control electrode receiving a second emission signal EMB, a first electrode connected to the third node N3C and a second electrode connected to a fourth node N4C. The fifth transistor T5C may connect the third node N3C and the fourth node N4C in response to the second emission signal EMB. The fifth transistor T5C may be referred to as a second emission transistor.

The sixth transistor T6C may include a control electrode receiving the initialization gate signal GI, a first electrode receiving the light emitting element initialization voltage VAINT and a second electrode connected to the fourth node N4C. The sixth transistor T6C may apply the light emitting element initialization voltage VAINT to the fourth node N4C in response to the initialization gate signal GI. The sixth transistor T6C may be referred to as a light emitting element initialization transistor.

The first capacitor C1C may include a first electrode connected to the first node N1C and a second electrode connected to the third node N3C. The second capacitor C2C may include a first electrode receiving the first power voltage ELVDD and a second electrode connected to the third node N3C.

The light emitting element EE may include a first electrode connected to the fourth node N4C and a second electrode receiving the second power voltage ELVSS. The light emitting element EE may emit light based on the driving current.

Figure 16:
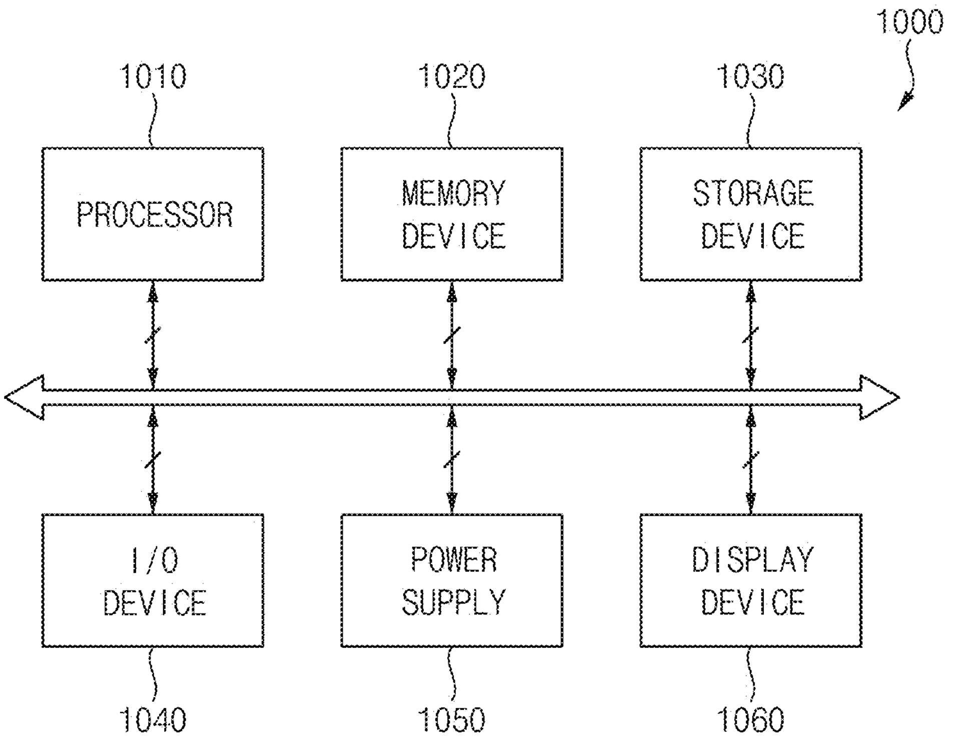
FIG. 16 is a block diagram illustrating an electronic device according to an embodiment.
Figure 17:
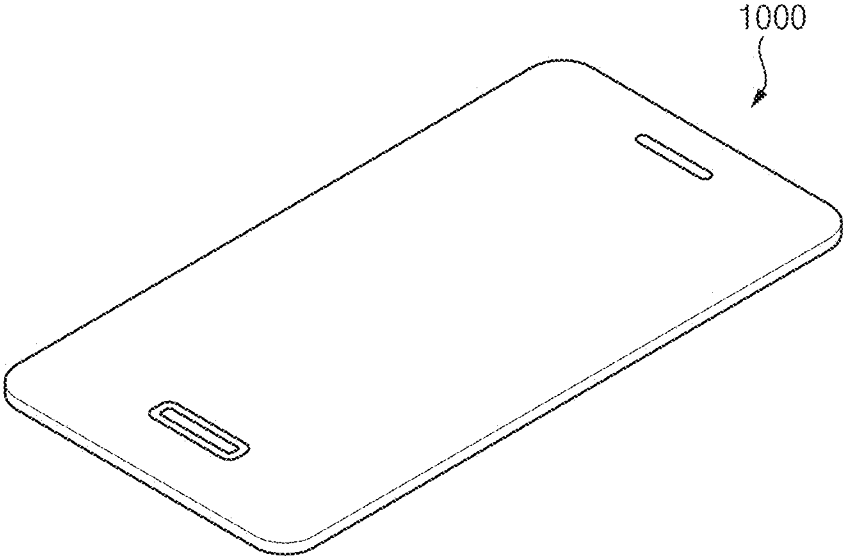
FIG. 17 is a diagram illustrating an example of the electronic device of FIG. 16.

FIG. 16 is a block diagram illustrating an electronic device 1000 according to an embodiment. FIG. 17 is a diagram illustrating an example of the electronic device of FIG. 15.

Referring to FIG. 16, the electronic device 1000 may include a processor 1010, a memory device 1020, a storage device 1030, an input/output (I/O) device 1040, a power supply 1050, and a display device 1060. The display device 1060 may be the display device of FIG. 1. Additionally, the electronic device 1000 may further include a plurality of ports for communicating with a video card, a sound card, a memory card, a universal serial bus (USB) device, and other electronic devices.

Referring to FIG. 17, the electronic device 1000 may be a smart phone. The electronic device 1000 may also be a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, and a data bus. The processor 1010 may be coupled to an extended bus such as a peripheral component interconnection (PCI) bus.

The processor 1010 may provide the input image data IMG, and the input control signal CONT to the driving controller 200 of FIG. 1.

The memory device 1020 may store data for operations of the electronic device 1000. The memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. The display device 1060 may be integrated into the I/O device 1040. The power supply 1050 may provide power for operations of the electronic device 1000. The display device 1060 may be coupled to other components via the buses or other communication links.

Referring to FIG. 17, the electronic apparatus of the present inventive concept is shown implemented as a smartphone, but the present inventive concept is not limited thereto. The electronic apparatus may be a television, a monitor, a laptop computer, or a tablet. Additionally, the electronic apparatus may be a car.

The display device according to the embodiments may be applied to a display device included in a computer, a notebook, a mobile phone, a smart phone, a smart pad, a PMP, a PDA, an MP3 player, or the like.

The embodiments of the present inventive concept and are not to be construed as limiting thereof. Although a few embodiments of the present inventive concept have been described, those skilled in the art will readily appreciate that many modifications are possible in the embodiments without materially departing from the spirit and scope of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the description of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display device comprising:

a display panel including a plurality of pixels;

a gate driver configured to output a gate signal to the pixels;

a data driver configured to apply a data voltage to the display panel; and a driving controller configured to control the gate driver and the data driver, wherein the display panel emits based on the data voltage, wherein the display panel includes first to fourth pixel-rows, wherein the data voltage includes a first data voltage and a second data voltage, wherein the first data voltage is applied to the first pixel-row and the third pixel-row, wherein the second data voltage is applied to the second pixel-row and the fourth pixel-row, wherein the gate signal includes a first gate signal and a second gate signal, wherein the first gate signal is outputted to the first pixel-row and the second pixel-row, wherein the second gate signal is outputted to the third pixel-row and the fourth pixel-row, wherein when the first gate signal has an activation level, the first data voltage is applied to the first pixel-row and the second data voltage is applied to the second pixel-row, and when the second gate signal has an activation level, the first data voltage is applied to the third pixel-row and the second data voltage is applied to the fourth pixel-row, wherein a period in which the display panel is driven includes first to third periods, wherein in the first period, the first gate signal has an activation level, the second gate signal has an inactivation level, the first data voltage has a first voltage level, and the second data voltage has a third voltage level, and wherein in the second period, the first gate signal has an inactivation level, the second gate signal has an activation level, the first data voltage is changed to a second voltage level, and the second data voltage has the third voltage level.

2. The display device of claim 1, wherein in the third period, the first gate signal has an inactivation level, the second gate signal has an activation level, the first data voltage has the second voltage level, and the second data voltage is changed to a fourth voltage level.

3. The display device of claim 2, wherein when the first data voltage is changed from the first voltage level and the second voltage level, the first data voltage is changed with a first slew rate, and wherein when the second data voltage is changed from the third voltage level to the fourth voltage level, the second data voltage is changed with a second slew rate different from the first slew rate.

4. The display device of claim 3, wherein the first slew rate is greater than the second slew rate.

5. The display device of claim 3, wherein the period in which the display panel is driven further includes a fourth period, wherein in the fourth period, the first data voltage is changed from the second voltage level to a fifth voltage level different from the second voltage level, wherein in the fourth period, the second data voltage is changed from the second voltage level to a sixth voltage level different from the fourth voltage level, wherein when the first data voltage is changed from the second voltage level to the fifth voltage level, the first data voltage is changed with the second slew rate, and wherein when the second data voltage is changed from the fourth voltage level to the sixth voltage level, the second data voltage is changed with the first slew rate.

6. The display device of claim 1, wherein the data driver includes:

a data voltage generating block configured to generate the data voltage based on a data signal; and a buffer block configured to output the first data voltage and the second data voltage based on the data voltage and a delay signal, and wherein the buffer block controls an output delay of at least one of the first data voltage and the second data voltage.

7. The display device of claim 6, wherein the buffer block outputs the second data voltage with the output delay.

8. The display device of claim 6, wherein the buffer block includes a plurality of first amplifiers and a plurality of second amplifiers, wherein the first amplifiers output the first data voltage based on a first bias voltage, wherein the second amplifiers output the second data voltage based on a second bias voltage, and wherein when the output delay of the second data voltage is controlled, the second bias voltage is lower than the first bias voltage.

9. The display device of claim 8, wherein the display panel further includes first to fourth data lines, and wherein at least one first amplifier of the first amplifiers are connected to the first data line and the third data line, and at least one second amplifier of the second amplifiers are connected to the second data line and the fourth data line.

10. The display device of claim 1, wherein the display panel includes a first data line receiving the first data voltage and a second data line receiving the second data voltage, wherein the first pixel-row includes a first pixel, the second pixel-row includes a second pixel, the third pixel-row includes a third pixel, and the fourth pixel-row includes a fourth pixel, wherein the first pixel and the third pixel are connected to the first data line, and wherein the second pixel and the fourth pixel are connected to the second data line.

11. The display device of claim 1, wherein at least one pixel among the plurality of pixels includes:

a first transistor configured to generate a driving current based on a voltage of a first node;

a second transistor configured to apply the data voltage to the first node in response to the gate signal; and a light emitting element configured to emit based on the driving current.

12. A display device comprising:

a display panel including a plurality of pixels;

a gate driver configured to output a gate signal to the pixels;

a data driver configured to apply a data voltage to the display panel; and a driving controller configured to control the gate driver and the data driver, wherein the display panel emits based on the data voltage, wherein the display panel includes first to fourth pixel-rows, wherein the gate signal includes a first gate signal and a second gate signal, the first gate signal is outputted simultaneously to the first pixel-row and the second pixel-row, and the second gate signal is outputted simultaneously to the third pixel-row and the fourth pixel-row, wherein the data voltage includes a first data voltage and a second data voltage, wherein the first data voltage is applied to the first pixel-row, and the third pixel-row, wherein the second data voltage is applied to the second pixel-row and the fourth pixel-row, wherein the data driver includes:

a data voltage generating block configured to generate the data voltage based on a data signal; and a buffer block configured to output the first data voltage and the second data voltage based on a delay signal, and wherein the buffer block controls an output delay of the second data voltage differently from an output delay of the first data voltage based on the delay signal.

13. The display device of claim 12, wherein, after the first gate signal is outputted, the second gate signal is outputted.

14. The display device of claim 12, wherein the buffer block includes a plurality of first amplifiers and a plurality of second amplifiers, wherein the first amplifiers outputs the first data voltage based on a first bias voltage, wherein the second amplifiers outputs the second data voltage based on a second bias voltage, and wherein when the output delay of the second data voltage is controlled, the second bias voltage is lower than the first bias voltage.

15. An electronic device comprising:

a processor configured to output input image data and an input control signal;

a display panel including a plurality of pixels;

a gate driver configured to output a gate signal to the pixels;

a data driver configured to apply a data voltage to the display panel; and a driving controller configured to control the gate driver and the data driver based on the input image data and the input control signal, wherein the display panel emits based on the data voltage, wherein the display panel includes first to fourth pixel-rows, wherein the data voltage includes a first data voltage and a second data voltage, wherein the first data voltage is applied to the first pixel-row and the third pixel-row, wherein the second data voltage is applied to the second pixel-row and the fourth pixel-row, wherein the gate signal includes a first gate signal and a second gate signal, wherein the first gate signal is outputted to the first pixel-row and the second pixel-row, wherein the second gate signal is outputted to the third pixel-row and the fourth pixel-row, wherein when the first gate signal has an activation level, the first data voltage is applied to the first pixel-row and the second data voltage is applied to the second pixel-row, and when the second gate signal has an activation level, the first data voltage is applied to the third pixel-row and the second data voltage is applied to the fourth pixel-row, wherein a period in which the display panel is driven includes first to third periods, wherein in the first period, the first gate signal has an activation level, the second gate signal has an inactivation level, the first data voltage has a first voltage level, and the second data voltage has a third voltage level, and wherein in the second period, the first gate signal has an inactivation level, the second gate signal has an activation level, the first data voltage is changed to a second voltage level, and the second data voltage has the third voltage level.

16. The electronic device of claim 15, wherein in the third period, the first gate signal has an inactivation level, the second gate signal has an activation level, the first data voltage has the second voltage level, and the second data voltage is changed to a fourth voltage level.

17. The electronic device of claim 16, wherein when the first data voltage is changed from the first voltage level and the second voltage level, the first data voltage is changed with a first slew rate, and wherein when the second data voltage is changed from the third voltage level to the fourth voltage level, the second data voltage is changed with a second slew rate different from the first slew rate.

18. The electronic device of claim 17, wherein the first slew rate is greater than the second slew rate.

19. The electronic device of claim 17, wherein the period in which the display panel is driven further includes a fourth period, wherein in the fourth period, the first data voltage is changed from the second voltage level to a fifth voltage level different from the second voltage level, wherein in the fourth period, the second data voltage is changed from the second voltage level to a sixth voltage level different from the fourth voltage level, wherein when the first data voltage is changed from the second voltage level to the fifth voltage level, the first data voltage is changed with the second slew rate, and wherein when the second data voltage is changed from the fourth voltage level to the sixth voltage level, the second data voltage is changed with the first slew rate.

20. The electronic device of claim 15, wherein the data driver includes:

a data voltage generating block configured to generate the data voltage based on a data signal; and a buffer block configured to output the first data voltage and the second data voltage based on the data voltage and a delay signal, and wherein the buffer block controls an output delay of at least one of the first data voltage and the second data voltage.

* * * * *